(12) United States Patent
Umeki et al.

(10) Patent No.: US 9,143,544 B2
(45) Date of Patent: Sep. 22, 2015

(54) INFORMATION PROCESSING APPARATUS FOR REPRODUCING AND IDENTIFYING CONTENT STREAMS AT PLURAL NETWORK DEVICES

(71) Applicant: SONY COMPUTER ENTERTAINMENT INC., Tokyo (JP)

(72) Inventors: Tsubasa Umeki, Tokyo (JP); Toru Ogiso, Tokyo (JP); Makoto Watanabe, Tokyo (JP); Shingo Mimura, Tokyo (JP); Toshiyuki Kurosaki, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 279 days.

(21) Appl. No.: 13/710,620

(22) Filed: Dec. 11, 2012

(65) Prior Publication Data

US 2013/0103851 A1 Apr. 25, 2013

Related U.S. Application Data

(63) Continuation of application No. PCT/JP2011/001277, filed on Mar. 4, 2011.

(30) Foreign Application Priority Data

| Jun. 22, 2010 | (JP) | 2010-141867 |
| Jun. 22, 2010 | (JP) | 2010-141868 |
| Jun. 22, 2010 | (JP) | 2010-141869 |

(51) Int. Cl.
*G06F 15/16* (2006.01)
*G06F 3/00* (2006.01)
(Continued)

(52) U.S. Cl.
CPC .......... *H04L 65/60* (2013.01); *G06F 17/30026* (2013.01); *G06F 17/30761* (2013.01)

(58) Field of Classification Search
USPC .......... 709/231–232, 219, 218, 217; 715/751; 455/500, 517
See application file for complete search history.

(56) References Cited

U.S. PATENT DOCUMENTS 7,519,667 B1 * 4/2009 Capps ........................... 709/206
8,280,815 B2 * 10/2012 Lutnick et al. .................. 705/51
(Continued)

FOREIGN PATENT DOCUMENTS

| CN | 101025810 | 8/2007 |
| JP | 2007-179410 | 7/2007 |

(Continued)

OTHER PUBLICATIONS

International Search Report dated May 17, 2011, from corresponding International Application No. PCT/JP2011/001277.
(Continued)

*Primary Examiner* — Aftab N. Khan
(74) *Attorney, Agent, or Firm* — Katten Muchin Rosenman LLP

(57) ABSTRACT

A reproduction information acquiring unit acquires information identifying content streams reproduced by the information processing apparatus. A content information acquiring unit acquires, from a communicating terminal apparatus, information identifying the content streams being reproduced by the communicating terminal apparatus. A display processing unit generates a display screen to be displayed on a display, by using the information acquired respectively by the reproduction information acquiring unit and the content information acquiring unit. A screen display unit displays the display screen generated.

8 Claims, 14 Drawing Sheets

(51) Int. Cl.
  H04L 29/06    (2006.01)
  G06F 17/30    (2006.01)

(56) References Cited

U.S. PATENT DOCUMENTS

| | | |
|---|---|---|
| 2003/0037157 A1* | 2/2003 | Pestoni et al. ............. 709/231 |
| 2004/0248601 A1* | 12/2004 | Chang ...................... 455/500 |
| 2005/0004995 A1* | 1/2005 | Stochosky ................. 709/219 |
| 2007/0049256 A1 | 3/2007 | Wassingbo |
| 2007/0091357 A1* | 4/2007 | Konno et al. ............. 358/1.15 |
| 2007/0168262 A1* | 7/2007 | Morotomi et al. ........... 705/26 |
| 2007/0198682 A1* | 8/2007 | Pazhyannur et al. ....... 709/223 |
| 2008/0268771 A1* | 10/2008 | Masuda ................... 455/3.01 |
| 2009/0004973 A1* | 1/2009 | Andrews et al. .......... 455/66.1 |
| 2009/0157892 A1* | 6/2009 | Sekiguchi et al. .......... 709/231 |
| 2010/0046633 A1* | 2/2010 | Kasai et al. ............ 375/240.25 |
| 2013/0097506 A1* | 4/2013 | Millington .................. 715/716 |

FOREIGN PATENT DOCUMENTS

| | | |
|---|---|---|
| JP | 2008-278238 | 11/2008 |
| JP | 2009-506603 | 2/2009 |
| JP | 2009-225177 | 10/2009 |
| WO | 2007/023120 | 3/2007 |

OTHER PUBLICATIONS

International Preliminary Report on Patentability and Written Opinion of the International Searching Authority dated Jan. 15, 2013 from corresponding International Application No. PCT/JP2011/001277.

Notification of Reason(s) for Refusal dated Nov. 27, 2012, from corresponding Japanese Application No. 2010-141867.

Chinese First Office Action dated Dec. 30, 2013, from corresponding Chinese Application No. 201180030004.9.

* cited by examiner

INFORMATION PROCESSING APPARATUS FOR REPRODUCING AND IDENTIFYING CONTENT STREAMS AT PLURAL NETWORK DEVICES

BACKGROUND OF THE INVENTION

1. Field of the Invention

The present invention relates to a technology for reproduction of content streams and, in particular, a technology for reproduction of a received content stream or transmission of a content stream.

2. Description of the Related Art

With the arrival of downsized and lighter information processing devices, it is now a general mode of practice that information processing apparatuses are carried around for their respective use. In recent years, wireless communication environments have made their appearances in which a plurality of users send and receive content files, such as music files, making use of base stations, access points, and such other infrastructure. At the same time, technologies for structuring ad-hoc wireless networks between information processing devices are also seeing their practical applications. In an ad-hoc network, exchange of content files is accomplished with a plurality of users performing wireless communications with each other using their own portable wireless communication terminals. In such a communication environment, it is generally practiced that content files, such as music files, are downloaded and reproduced at the information processing apparatuses. An infrastructure network or an ad-hoc network can be created by the use of the wireless LAN (Local Area Network) technology of IEEE 802.11.

RELATED ART LIST (1) United States Patent Application Publication No. US2006/0277472

A downloading of a music file may be carried out at the request of a user who desires to obtain the music file. As such, there may be a background that the user has listened to the music at least once in the past or has heard of good things said of the music. And in rare instances the users will download music files totally unknown to them.

With an understanding as described above, the present inventors have made investigations to find an environment that can realize exposure of people to new pieces of music to them. It has been found as a result that an effective use of the wireless LAN environment can create an environment in which the users of information processing apparatuses can listen to music being played to the other users, thus effectively increasing chances of their exposure to unknown music. In such an environment, it is desirable that the information processing apparatuses are capable of communicating the statuses of their own terminals and the other terminals efficiently to the users. Also, to realize such an environment readily, it is desirable that a system be created for the information processing apparatuses to effectively transmit information to the other terminals and to effectively receive information from the other terminals.

SUMMARY OF THE INVENTION

A purpose of the present invention is therefore to provide a technology that allows effective transmission or reception of information among the information processing apparatuses and that allows efficient communication of the statuses of their own and other terminals to the users.

In order to resolve the above-described problems, an information processing apparatus according to one embodiment of the present invention includes: a first acquiring unit configured to acquire first identification information identifying a content stream reproduced by the information processing apparatus; a second acquiring unit configured to acquire, from a communicating terminal apparatus, second identification information identifying a content stream being reproduced by the communicating terminal apparatus; a display processing unit configured to generate a display screen to be displayed on a display, by using the first identification information and the second identification information acquired by the first acquiring unit and the second acquiring unit, respectively; and a screen display unit configured to display the display screen generated by the display processing unit.

An information processing apparatus according to another embodiment of the present invention includes: a first reproduction processing unit configured to reproduce audio data by reading out the audio data from a storage unit; an audio data acquiring unit configured to acquire, from a communicating terminal apparatus, audio data being reproduced by the communicating terminal apparatus; a second reproduction processing unit configured to reproduce the audio data acquired by the audio data acquiring unit; and an audio output unit configured to select an audio signal reproduced by either the first reproduction processing unit or the second reproduction processing unit so as to output the selected audio signal. When the audio data is being reproduced by the first reproduction processing unit, audio data acquired by the second reproduction processing unit is reproducible.

An information processing apparatus according to still another embodiment of the present invention includes: a request generator configured to generate a transmission request by which to make a request to a communicating terminal apparatus that audio data be sent from the communicating terminal apparatus; a transmitter configured to transmit the transmission request generated by the request generator; an audio data acquiring unit configured to acquire the audio data transmitted in response to the transmission request, from the communicating terminal apparatus; a reproduction processing unit configured to reproduce the audio data acquired by the audio data acquiring unit; and an audio output unit configured to output an audio signal reproduced by the reproduction processing unit. The audio data acquiring unit determines whether or not end data of the content stream data is contained in the acquired audio data.

Optional combinations of the aforementioned constituting elements, and implementations of the invention in the form of methods, apparatuses, systems, recording media, computer programs, recording media that store the programs, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

In recent years, there are ever-increasing instances of people downloading audio data such as music to their portable information processing apparatuses and listening to music outdoors while on the move or the like. For example, look around on a train, and you may notice a number of other people also listening to something with their earphones or headphones on. Seeing those people intently listening to something, you may wonder what they are listening to. Or when you are listening to a favorite piece of music, you may entertain a desire to share it with others. However, in reality, it is difficult to borrow the earphones from a complete stranger and listen to the music or lend your earphones to a stranger to have him/her listen to the music. Therefore, it will be desirable if you and the other people can share the listening to the same piece of music in synchronism with each other without the trouble of borrowing or lending earphones.

Figure 1:
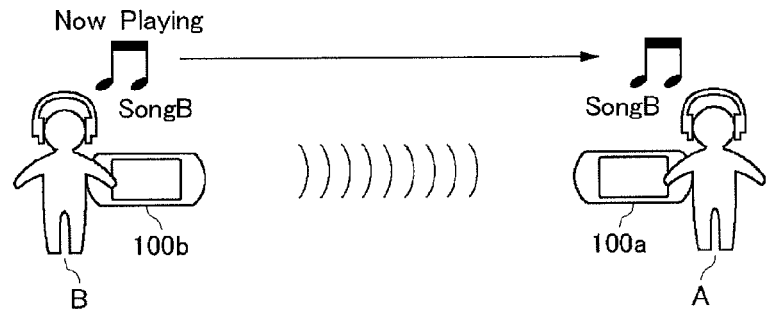
FIG. 1 is an illustration for explaining a synchronous stream reproduction system according to an exemplary embodiment of the present invention.

FIG. 1 is an illustration for explaining a synchronous stream reproduction system 1 according to the exemplary embodiments of the present invention. The synchronous stream reproduction system 1 provides an environment that realizes efficient exposure of people to new pieces of music. FIG. 1 illustrates by an example a scene of the synchronous stream reproduction system 1 being used. Information processing apparatuses 100a and 100b held by users have wireless communication function.

In this example, a user B is listening to music (Song B) now playing (being reproduced) on the information processing apparatus 100b. Now a user A sends a transmission request for the music (Song B) now being reproduced on the information processing apparatus 100b from the information processing apparatus 100a. Upon receipt of the transmission request, the information processing apparatus 100b of the user B transmits music data now playing from the reproduction point at the receiving of the transmission request to the information processing apparatus 100a. That is, the synchronous stream reproduction system 1 is such that the information processing apparatus 100b does not forward the whole of a music file but forwards the music data from the point of the music the user B is now listening to, to the information processing apparatus 100a. As a result, the user A can listen to the same piece of music in synchronism with the user B, thereby sharing the same pleasure with the user B who may be a complete stranger to the user A. In this manner, the synchronous stream reproduction system 1 can present an environment that can easily expose the user A to a new piece of music (Song B).

It is to be noted that the information processing apparatus 100b may be a possession of an individual, but it may also be a terminal apparatus installed at a music shop, for instance. In the latter case, the user A may have the benefit of trial listening to music recommended by the music shop, whereas the music shop may have the benefit of advertising.

Figure 2:
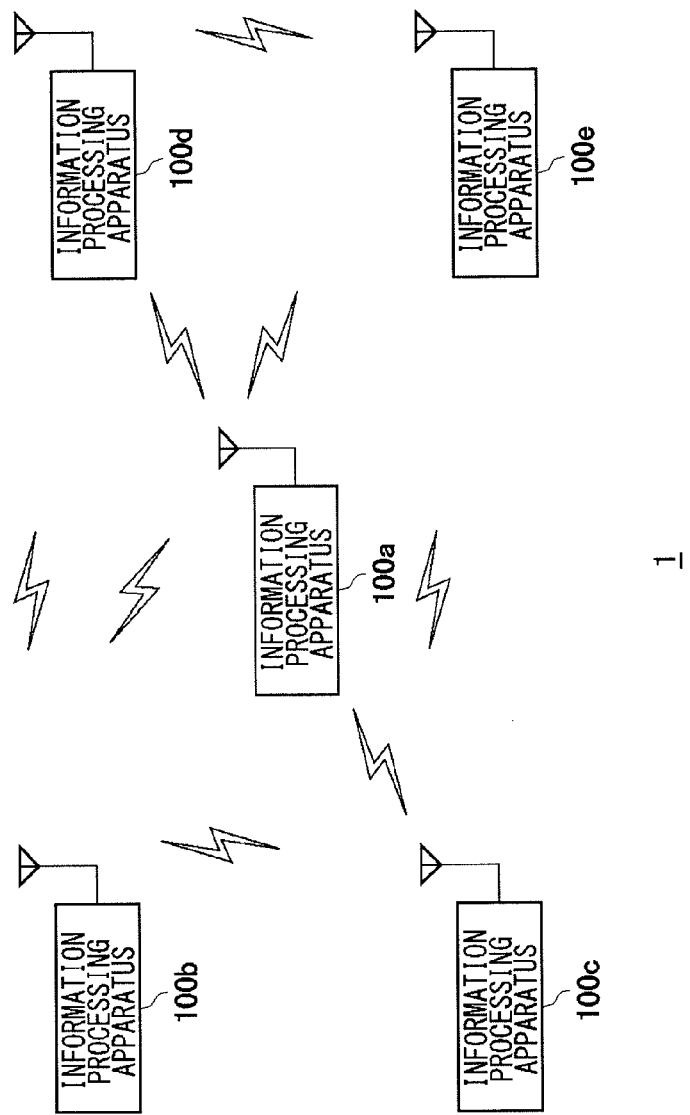
FIG. 2 shows a constitution of a synchronous stream reproduction system.

FIG. 2 shows a constitution of a synchronous stream reproduction system 1. The synchronous stream reproduction system 1 is configured by including a plurality of information processing apparatuses 100a, 100b, 100c, 100d, and 100e (hereinafter also referred to as "information processing apparatuses 100" or "information processing apparatus 100" when the individual units are not distinguished) capable of wireless communication. An information processing apparatus 100, in communication with the other information processing apparatuses 100, constructs an ad-hoc network using IEEE 802.11 and can transmit and receive signals. In the example shown here, an IBSS (Independent Basic Service Set) is formed as a wireless network.

The information processing apparatuses 100 belonging to the same IBSS can communicate with each other directly. With the synchronous stream reproduction system 1 in the present embodiment, the IBSS can be regarded as a group, and thus the information processing apparatuses 100 can belong to a single IBSS. In the single IBSS, the information processing apparatus 100b, for instance, may operate as a host to the information processing apparatus 100a and at the same time may operate as a client to the information processing apparatus 100e. In the present embodiment, the host is a terminal apparatus delivering a content stream, and the client is a terminal apparatus receiving the delivery of the content stream.

It is to be understood that the information processing apparatus 100 may communicate with the other information processing apparatuses 100, using a communication function based on some wireless communication scheme other than WLAN (Wireless Local Area Network) and/or a wired communication scheme. Some wireless communication scheme other than WLAN that can be used may be such a communication scheme as Bluetooth (registered trade mark) or TransferJet (registered trade mark). Also, the communication network between the information processing apparatuses 100 may be structured by forming an infrastructure BSS (Basis Service Set) using IEEE 802.11 instead of an IBSS.

Described below as an example is a case where audio data now playing (being reproduced) on the information processing apparatus 100b is transmitted from the information processing apparatus 100b operating as the host to the information processing apparatus 100a operating as the client in a wireless network structured as an IBSS. Note that although music data is presented as an example of audio data below, data other than that of music, such as recitation of a poem, voice message, and the like, are also included in the audio data.

At this time, however, it is not necessary that the audio data being reproduced by the information processing apparatus 100b are being outputted as an audio output therefrom, but only the processing to turn them into audio signals is going on through the process of decoding. In other words, when a reproduction of music data held by the information processing apparatus 100b is going on at the information processing apparatus 100b, it is not necessary that the user B of the information processing apparatus 100b is listening to the music, but the user B may be listening to some other music sent from the information processing apparatus 100e, for instance. On this occasion, a reproduction of music data held by its own terminal and a reproduction of music data sent from the information processing apparatus 100e are being executed independently in parallel with each other at the information processing apparatus 100b.

Figure 3:
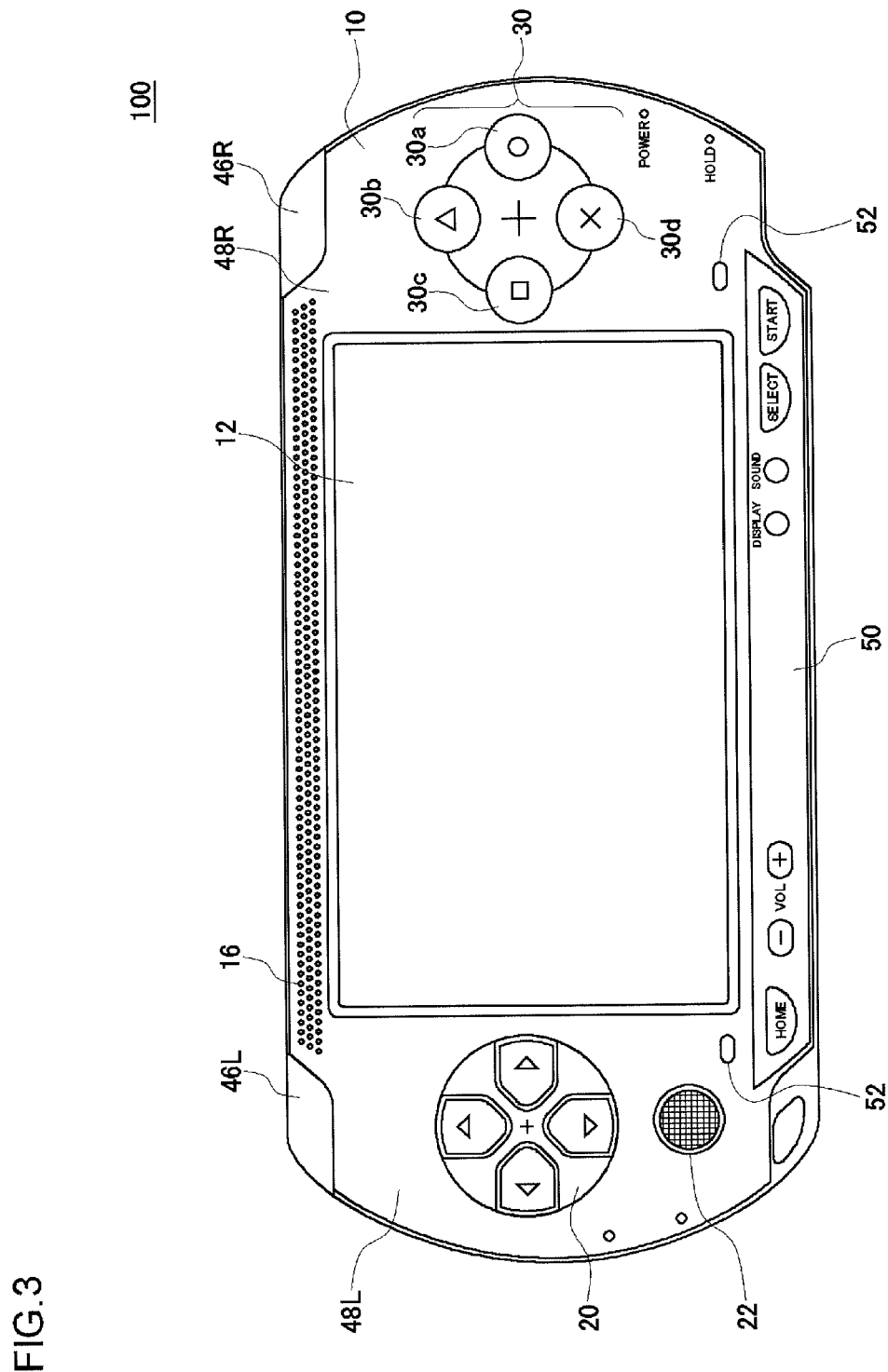
FIG. 3 is a front view of an information processing apparatus.
Figure 4:
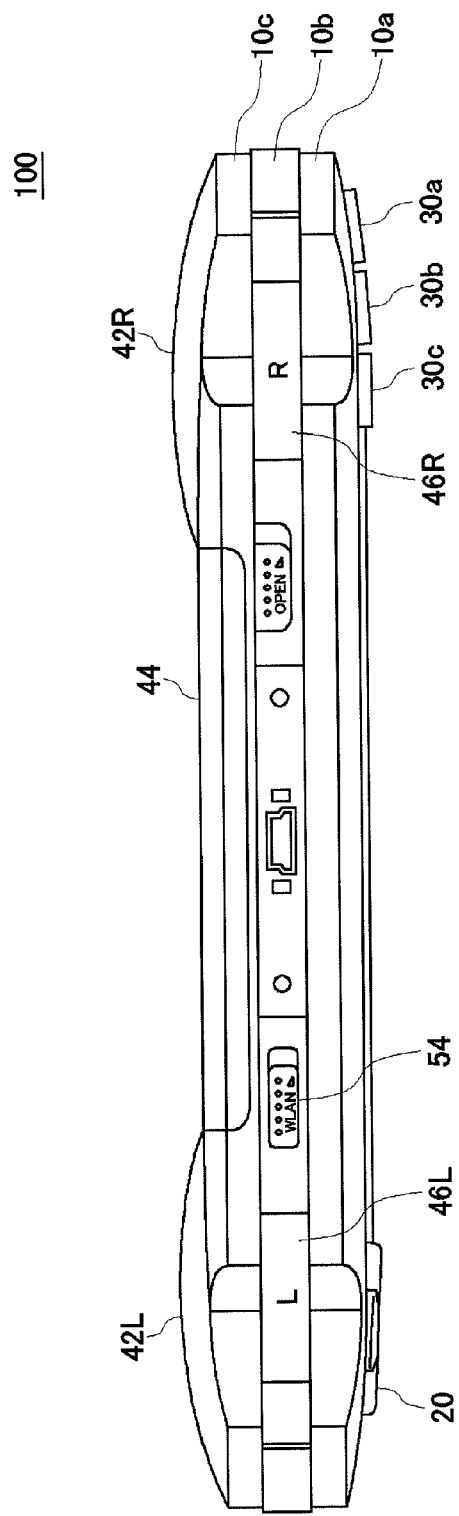
FIG. 4 is a top view of an information processing apparatus.

FIG. 3 is a front view of an information processing apparatus 100. FIG. 4 is a top view of the information processing apparatus 100. A casing 10 of the information processing apparatus 100 has a horizontally long shape as a whole, and each end of the casing 10 is curved to form an arc centered on a position displaced from the center line by a certain distance. The casing 10 is comprised of an upper portion 10a, a middle portion 10b and a lower portion 10c. Built inside the casing 10 is a circuit board (not shown) carrying components including switch nodes generating signals initiated by button operations and a central processing unit for processing the signals and executing various operations accordingly. The not-shown circuit board is fixed to the upper portion 10a or the lower portion 10c. The middle portion 10b is more rigid than the upper portion 10a and the lower portion 10c, securing the rigidity of the casing 10 as a whole.

A liquid crystal display 12 (hereinafter referred to as "LCD (Liquid Crystal Display) is fitted into a surface of the upper portion 10a of the casing 10, namely the center of the surface facing a user, as a display unit. Provided on the surface of the upper portion 10a are a left-hand area 48L held by the user's left hand, a right-hand area 48R held by the right hand, a horizontally long button area 50, located below the LCD 12, where various buttons are arranged, and a decorated area 16 located above the LCD 12.

The left-hand area 48L is provided with an arrow key 20 for inputting a direction indication, an analog device 22 for effecting an analog input, and a speaker 52. The right-hand area 48R is provided with push buttons 30a, 30b, 30c and 30d (hereinafter generically referred to as "push button 30" or "push buttons 30") for inputting operation instructions and a speaker 52. An L button 46L is a button operated by the user's left index finger or middle finger. An R button 46R is a button operated by the user's right index finger or middle finger.

Bulges 42L and 42R are formed at both ends of the back side of the casing 10. Formed in between the bulges 42L and 42R is a flat surface, and almost entire flat surface constitutes a cover 44 for a disk drive. The cover 44 opens toward the top of FIG. 4 by sliding an OPEN switch provided in the middle portion 10b. A disk can be placed in the not-shown disk drive located below the cover 44. The disk provides an application program or a game program run on the information processing apparatus 100, data for use in playing back moving images, or data for use in playing back music.

Also, a WLAN switch 54 is provided on the top face of the casing 10. The WLAN switch 54 is used to turn on or off the function of a communication unit of the information processing apparatus 100. More specifically, when the WLAN switch 54 is moved to the right in FIG. 4, a WLAN (Wireless Local Area) module in the information processing apparatus 100 is started, so that the information processing apparatus 100 can wirelessly communicate with other apparatuses. Also, an insertion slot where an external memory is insertable is provided on a lateral side of the casing 10. Although the speakers 52 are provided on the surface of the casing, inserting an earphone into a slot (not shown) allows the sound to be outputted through the earphone.

The information processing apparatus 100 according to the present embodiment can function as various types of devices. If, for example, a disk that stores a game program is inserted into the disk drive, the information processing apparatus 100 functions as a game device. Also, if the music data and the moving image data are recorded in the memory unit, the information processing apparatus 100 can function as a content reproduction device. In the following exemplary embodiments, a description is given of a case where the information processing apparatus 100 functions as a playback device that mainly plays back the music data, such as music, and outputs sound.

In the synchronous stream reproduction system 1, a single information processing apparatus 100 can execute two-system reproduction processings independently, operate as a host providing a content stream and, at the same time, operate as a client receiving the content streams from other information processing apparatuses 100. In the following description, for convenience of description, the functions of both the client and host will be explained on condition that the information processing apparatus 100a operates as a client and the information processing apparatus 100b operates as a host.

Figure 5:
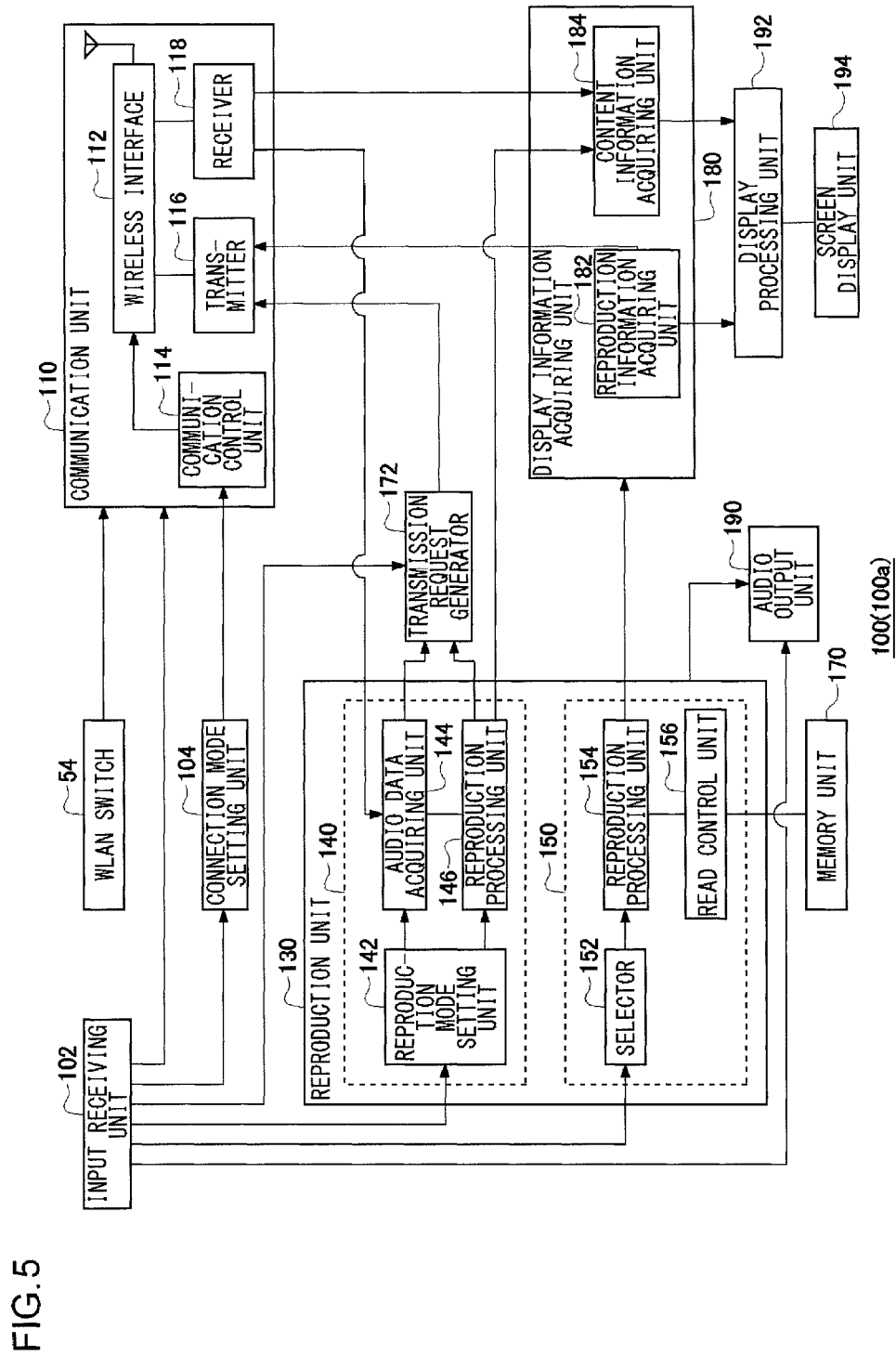
FIG. 5 is a diagram for explaining the functions of an information processing apparatus that operates as a client.

FIG. 5 is a diagram for explaining the functions of an information processing apparatus 100a that operates as a client. The information processing apparatus 100a includes an input receiving unit 102, a connection mode setting unit 104, a communication unit 110, a reproduction unit 130, a transmission request generator 172, a display information acquiring unit 180, an audio output unit 190, a display processing unit 192, and a screen display unit 194. The communication unit 110 includes a wireless interface 112, a communication control unit 114, a transmitter 116, and a receiver 118. The reproduction unit 130 has a first reproduction unit 150 and a second reproduction unit 140. The first reproduction unit 150 includes a selector 152, a reproduction processing unit 154, and a read control unit 156. The second reproduction unit 140 includes a reproduction mode setting unit 142, an audio data acquiring unit 144, and a reproduction processing unit 146. The display information acquiring unit 180 has a reproduction information acquiring unit 182 and a content information acquiring unit 184.

Figure 6:
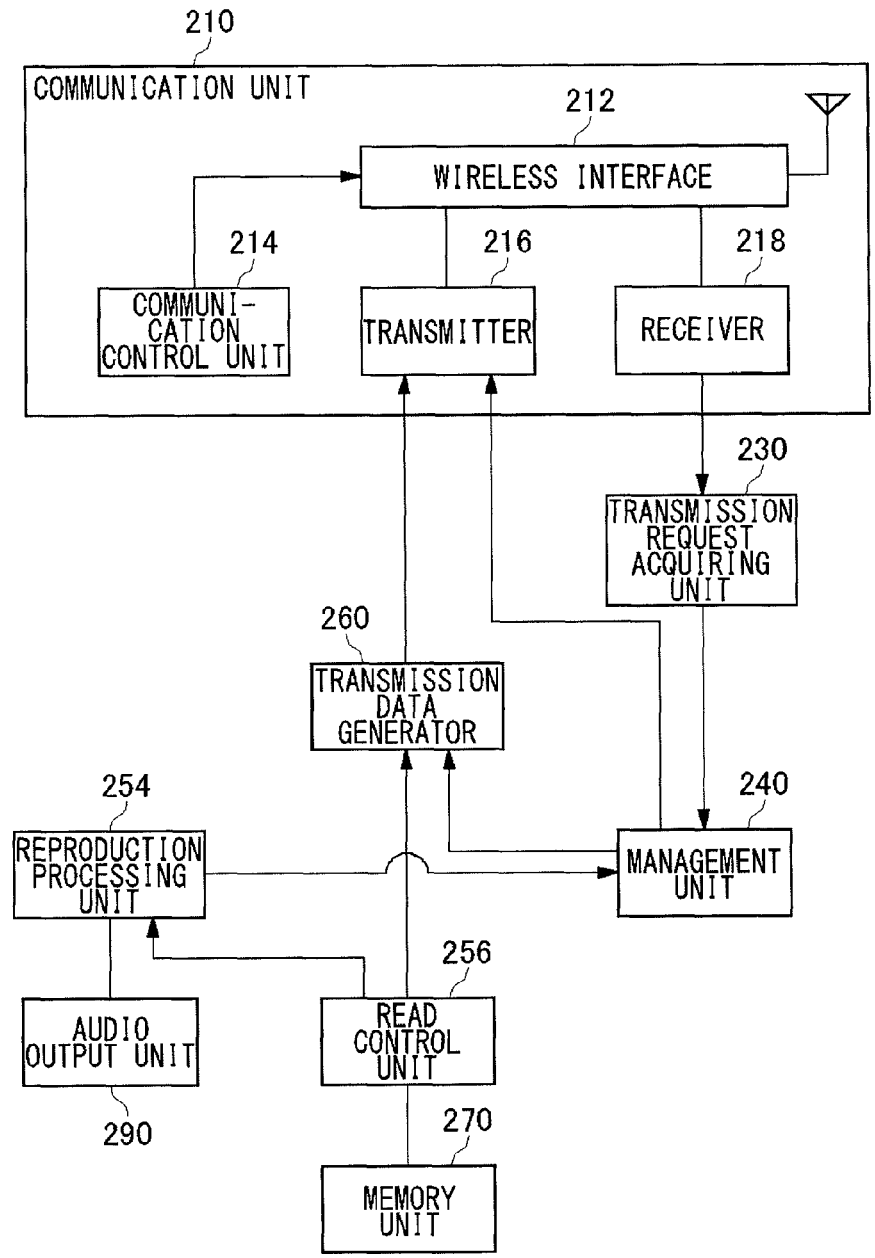
FIG. 6 is a diagram for explaining the functions of an information processing apparatus that operates as a host.

FIG. 6 is a diagram for explaining the functions of an information processing apparatus 100b that operates as a host. The information processing apparatus 100b includes a communication unit 210, a transmission request acquiring unit 230, a management unit 240, a reproduction processing unit 254, a read control unit 256, a transmission data generator 260, a memory unit 270, and an audio output unit 290. The communication unit 210 includes a wireless interface 212, a communication control unit 214, a transmitter 216, and a receiver 218. The communication unit 210, the reproduction processing unit 254, the read control unit 256, and the audio output unit 290 shown in FIG. 6 correspond to the communication unit 110, the reproduction processing unit 154, the read control unit 156, and the audio output unit 190 shown in FIG. 5, respectively.

The functions of the information processing apparatus 100 are realized by a CPU (Central Processing Unit), memory and memory-loaded programs or the like. FIG. 5 and FIG. 6 depict functional blocks implemented by cooperation of the CPU, memory and memory-loaded programs or the like. The programs may be built into the information processing apparatus 100. Therefore, it will be obvious to those skilled in the art that these functional blocks may be implemented by a variety of manners including hardware only, software only or a combination of both. Although FIG. 5 shows the functional blocks of a client terminal and the FIG. 6 shows the functional blocks of a host terminal, the information processing apparatus 100 is configured to be operable as both the client terminal and the host terminal. Hence, in the actual setting, the information processing apparatus 100 alone has both the configuration of a client terminal and the configuration of a host terminal.

The information processing apparatus 100 has a "basic reproduction function" whereby the music data recorded in the memory unit undergoes a reproduction processing and then audio signals are generated. Also, the information processing apparatus 100 according to the present exemplary embodiment has an "additional reproduction function" whereby, on condition that the WLAN switch 54 is turned on, the music data being reproduced by the other information processing apparatus 100 is received and subjected to the reproduction processing and thereby the audio signals are generated. Though "reproduction" may generally include the output of audio signals from the speakers 52 and the earphones, the "reproduction" in the exemplary embodiments means that the compressed audio data is decoded and then converted into audio signals.

The additional reproduction function is achieved on condition that the WLAN switch 54 is turned on and thus a WLAN module is active (ON state). Suppose that the information processing apparatus 100 has a communication function using a communication protocol other than the WLAN, namely, using other wireless protocols and/or wire communication protocols. Then the additional reproduction function may be achieved on condition that such communication functions are in the ON state.

Also, the additional reproduction function may be achieved on condition that the basic reproduction function is also started. A purpose of the synchronous stream reproduction system 1 is that an environment where a user can listen to the music being reproduced by another user's terminal is achieved and that an environment where the music being reproduced by the user himself/herself can be listened to by other users is achieved. Thus, the information processing apparatus 100 may participate in the synchronous stream reproduction system 1 on the condition, for example, that the basic reproduction function is started, namely, on condition that audio data is being reproduced.

Figure 7:
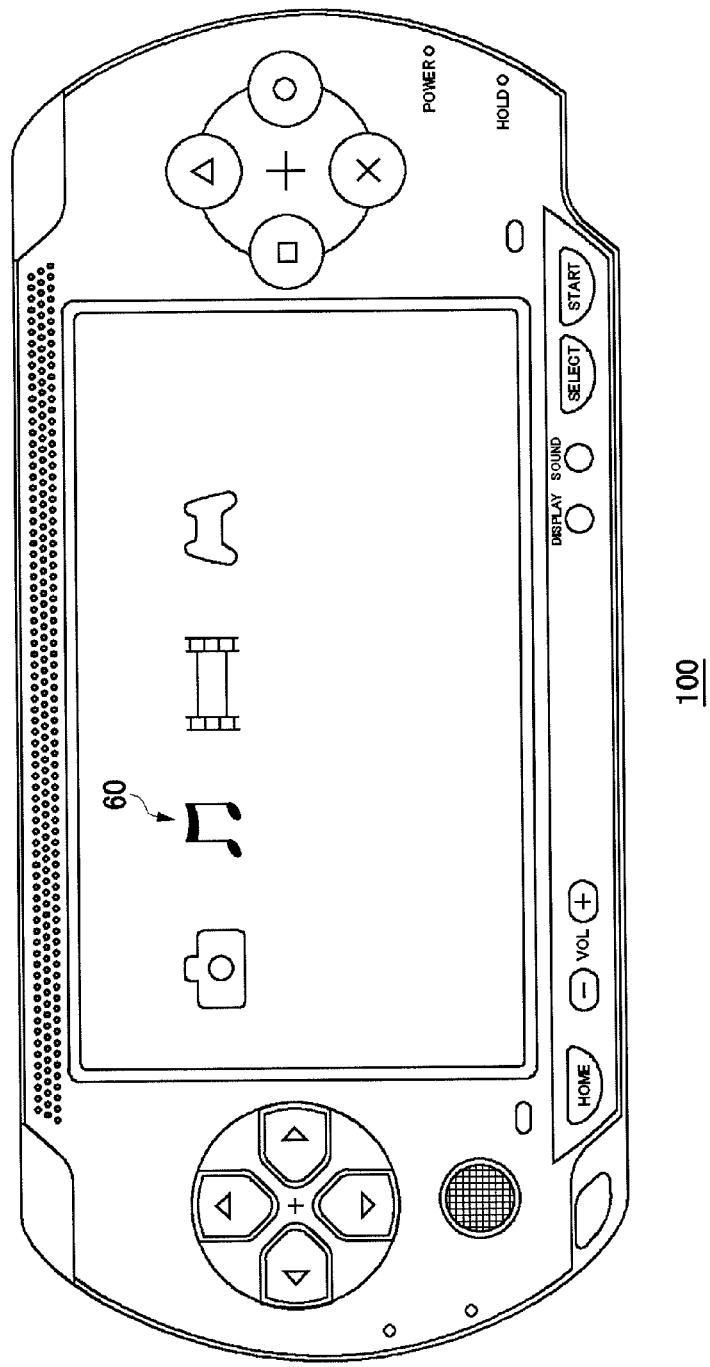
FIG. 7 shows an example of a menu screen.
Figure 8:
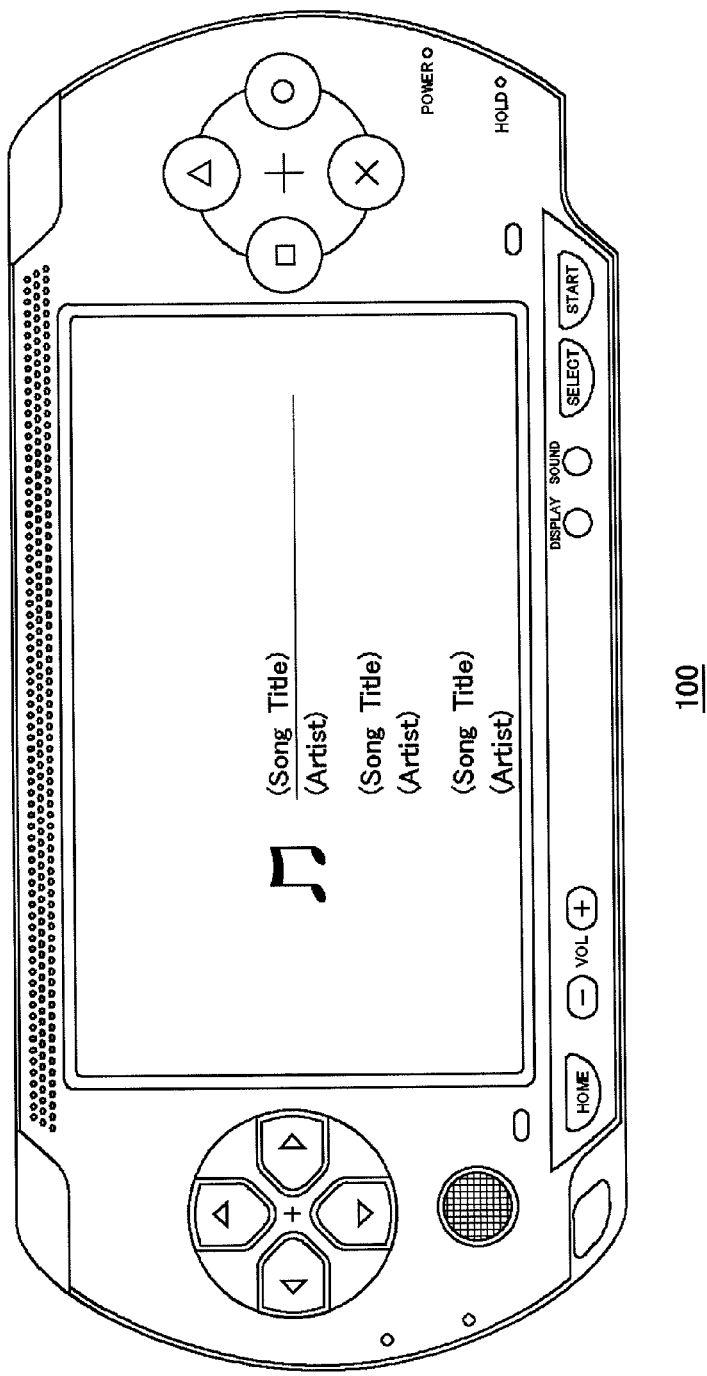
FIG. 8 shows a selection screen for pieces of music.

Referring to FIG. 5, the basic reproduction function will be explained. With the power to the information processing apparatus 100 turned on, a menu screen will be displayed on the LCD 12. FIG. 7 shows an example of a menu screen. Arranged on the menu screen is a row of icons indicating their respective applications. With the user selecting an icon 60 of a musical note, a selection screen for music will be displayed on the LCD 12. FIG. 8 shows a selection screen for pieces of music. These processings are executed by system software. With the icon 60 selected, the system software reads out information for identifying music data stored in a memory unit 170, which is the titles of songs and information on the artists in this case, and produces a selection screen of a list of songs as shown in FIG. 8. Note that, in FIG. 8, the fields for song titles and artists, where actual titles of songs and actual artists will be shown in the actual selection screen, are simply indicated by (Song Title) and (Artist). On a song title selection screen, the user selects the title of the song to be reproduced by operating the arrow keys 20 and the buttons 30. With the operation as described above, the basic reproduction function will be activated.

The basic reproduction function is carried out by the first reproduction unit 150. In FIG. 5, as the input receiving unit 102 receives a song title selection by the user, the selector 152 conveys the song title selected for reproduction to the reproduction processing unit 154. The reproduction processing unit 154 instructs the read control unit 156 to read out the song (music) data. The read control unit 156 controls the reading-out of the data from the removable memory unit 170. Note, however, that the memory unit 170 is not limited to a removable type relative to the information processing apparatus 100, but may be a built-in type such as a hard disk drive or the like.

Upon reading out the song data via the read control unit 156, the reproduction processing unit 154 starts a reproduction processing from the top of the audio data. Since the song data contains both the audio data and information identifying the song, the reproduction processing unit 154 presents information identifying the song to be reproduced to the reproduction information acquiring unit 182 as the reproduction processing unit 154 starts reproduction of the audio data. The information to be presented to the reproduction information acquiring unit 182 may include at least the song title, the artist name, and the time length of the song. The information may also include the cover photo image of the song or the like. The reproduction processing unit 154 may present such information prior to the start of reproduction processing of the audio data or at the start thereof. After the start of reproduction processing, the reproduction processing unit 154 may present information concerning the song being reproduced (now playing), such as the completed reproduction time, periodically to the reproduction information acquiring unit 182. The reproduction processing unit 154 generates audio signals through a decoding according to the compression format of the audio data. The audio output unit 190 outputs audio signals reproduced by the reproduction processing unit 154. The audio output unit 190 may be the speakers 52, earphone, or the like and may also be an amplifier that supplies audio signals to the speakers 52, the earphone, or the like.

Figure 9:
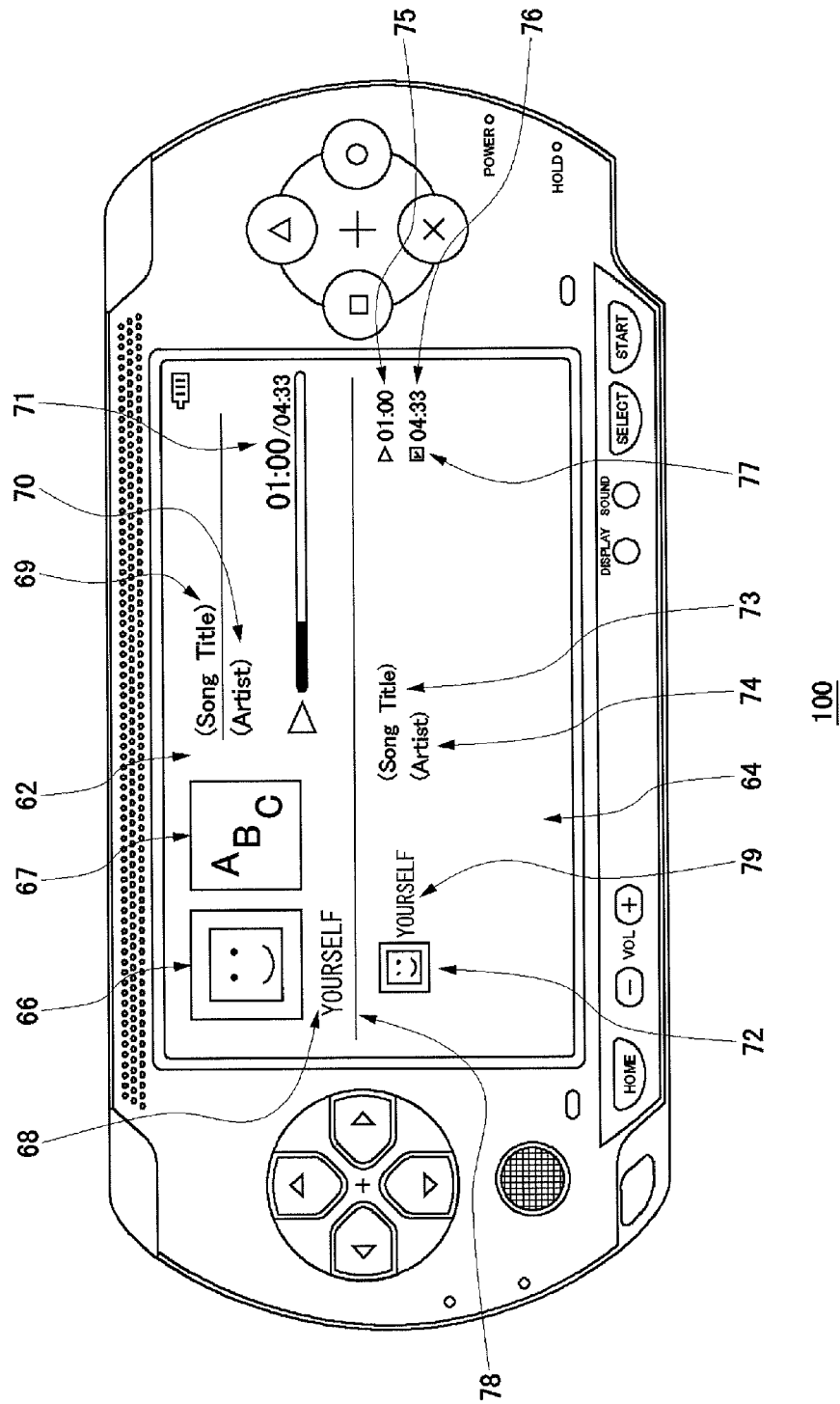
FIG. 9 shows an example of a reproduction screen.

FIG. 9 shows an example of a reproduction screen. The reproduction information acquiring unit 182 acquires information identifying the song to be reproduced by the reproduction processing unit 154 and information concerning the song being reproduced and supplies them to the display processing unit 192. The display processing unit 192 generates a display screen to be displayed on the LCD 12, using the information supplied by the reproduction information acquiring unit 182, and the screen display unit 194 displays the display screen on the LCD 12. Shown in FIG. 9 is an example of a reproduction screen generated by the display processing unit 192.

The display processing unit 192 divides the reproduction screen into at least two regions. In this example, the reproduction screen is divided into two regions, namely, a first region 62, which is the upper part thereof, and a second region 64, which is the lower part thereof. The first region 62 and the second region 64 may be separated explicitly by a dividing line 78, or otherwise the division can be made without the presence of the dividing line 78.

The display processing unit 192 arranges information identifying the song outputted from the audio output unit 190 in the first region 62. The first region 62 located above the second region 64 makes it easy for the user to recognize the song now being audio-outputted. Also, displaying the information shown in the first region 62 larger than that shown in the second region 64 may make it easier for the user to recognize the song now being audio-outputted.

In this example, arranged in the first region 62 are a user icon 66 and a user name 68, which are to identify the user in possession of the song to be audio-outputted, a thumbnail 67, such as a cover photo of the song, a song title 69, an artist name 70, and time information 71 showing the completed reproduction time relative to the time length of the song. It goes without saying that information other than these may be arranged therein.

The display processing unit 192 arranges in the second region 64 information identifying the song that can be audio-outputted from the audio output unit 190. In this example, arranged in the second region 64 are a user icon 72 and a user name 79, which are to identify the user in possession of the song, a song title 73, an artist name 74, the completed reproduction time 75, total time length 76, and output identification information 77. The output identification information 77 is the information displayed to facilitate identification of the song now being audio-outputted out of the songs displayed in the second region 64. The display processing unit 192 adds the output identification information 77, which is to indicate the stream being audio-outputted, to the song information in the second region 64 corresponding to the song information arranged in the first region 62. Although signs to be added to identify the song being outputted are shown as an example, the output identification information 77 may not necessarily be such signs added, but may be a display color change for the song information, for instance, that enables identification of the song being outputted. FIG. 9 illustrates a reproduction screen when the basic reproduction function only is being carried out, so that the song that can be audio-outputted is limited to one possessed by the user himself/herself. Hence, the information displayed in the second region 64 is the same as the information contained in the first region 62.

Note that when the basic reproduction function only is being carried out, only the song being reproduced on the user's own terminal is displayed in the second region 64. Therefore, the display processing unit 192 is not required to set the second region 64. On the other hand, when an additional reproduction function to be discussed below is carried out, the display processing unit 192 divides the reproduction screen into the first region 62 and the second region 64 to display the song being reproduced at a terminal other than the user's own in the second region 64.

Next, referring to FIG. 5, the additional reproduction function will be explained. The additional reproduction function is carried out by the second reproduction unit 140. As already described, the additional reproduction function is started up on condition that the WLAN switch 54 is turned on. It is to be noted that if the WLAN switch 54 is turned on before the start of the basic reproduction function, then the additional reproduction function will be started simultaneously with the start of the basic reproduction function.

With the WLAN switch 54 turned on, the function of the communication unit 110 becomes active (ON state), thereby enabling the information processing apparatus 100*a* to carry out wireless communication. First the communication control unit 114 searches for WLAN terminals present in the surrounding area. This search processing is performed periodically. When any other WLAN terminal is detected by the search processing of the communication control unit 114 or when the information processing apparatus 100*a* is detected by the search processing of another WLAN terminal, an IBSS is formed between the information processing apparatus 100*a* and the other WLAN terminal. With an IBSS formed, each of the terminals (including the information processing apparatus 100*a*) belonging to the IBSS periodically transmits, by broadcast, information identifying the song being reproduced by its own terminal and information concerning the song(s) being reproduced. The transmitter 116 of the information processing apparatus 100*a* acquires information identifying the song being reproduced by the reproduction processing unit 154 and information concerning the song(s) being reproduced from the reproduction information acquiring unit 182 and periodically transmits them by broadcast throughout the IBSS.

The receiver 118 receives information transmitted by broadcast from the other WLAN terminals via the wireless interface 112 and supplied the information to the content information acquiring unit 184. The content information acquiring unit 184 acquires information identifying the song being reproduced by each of the other WLAN terminals and information concerning the song(s) thus being reproduced and supplies them to the display processing unit 192. The display processing unit 192 generates a display screen to be displayed on the LCD 12, using the information supplied from the content information acquiring unit 184 and the information supplied from the reproduction information acquiring unit 182, and the screen display unit 194 displays the generated display screen on the LCD 12.

Figure 10:
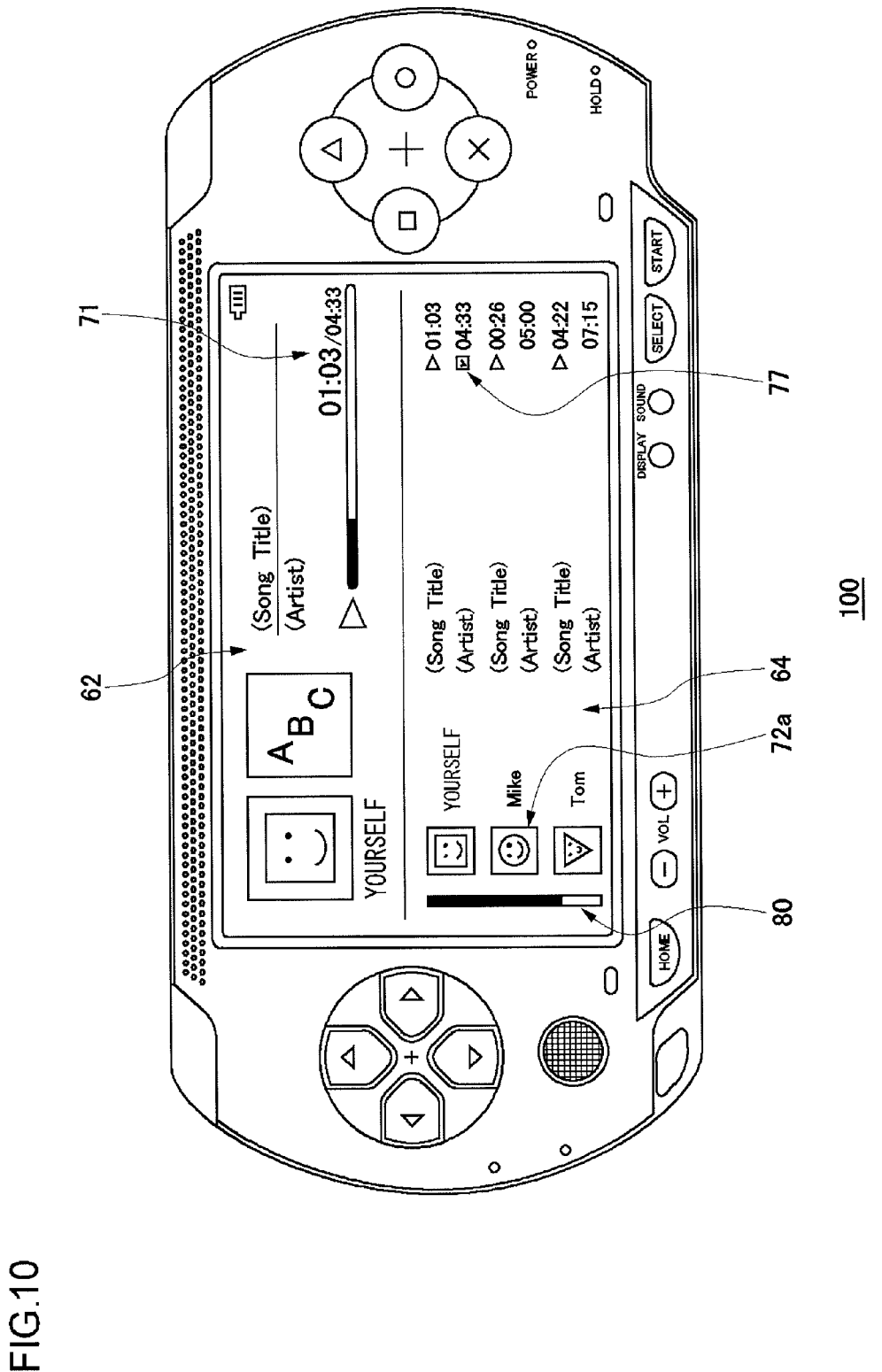
FIG. 10 shows an example of a reproduction screen when an additional reproduction function is being carried out.

FIG. 10 shows an example of a reproduction screen when the additional reproduction function is being carried out. The reproduction screen shown in FIG. 10 represents a state three seconds past the reproduction screen of FIG. 9. Thus the time information 71 in the first region 62 is updated such that the reproduction time of 1:00 is updated to 1:03 indicating the lapse of three seconds. As already mentioned, the reproduction time of the song being reproduced by the reproduction processing unit 154 is being supplied to the reproduction information acquiring unit 182 periodically, so that the display processing unit 192 can cause a display of the reproduction time of the song being reproduced by the reproduction processing unit 154 on the reproduction screen.

The display processing unit 192 arranges in the second region 64 information identifying the songs that can be audio-outputted from the audio output unit 190. More specifically, the display processing unit 192 produces a list out of the information acquired by the reproduction information acquiring unit 182 and the information acquired by the content information acquiring unit 184, and arranges the list in the second region 64. The reproduction screen shown in FIG. 10 differs from that of FIG. 9 in that information identifying the songs belonging to the other users (Mike, Tom) is being displayed. In this manner, the LCD 12 displaying the information identifying the songs that can be audio-outputted can offer the user chances to select songs to be audio-outputted, namely, an environment in which he/she can be exposed to new types of music. It is to be noted that, in the reproduction screen depicted in FIG. 10, the user continues listening to the song held by the information processing apparatus 100, and therefore the output identification information 77 is added to the song held by the user himself/herself.

The display processing unit 192 arranges in the second region 64 the information acquired by the reproduction information acquiring unit 182 in a predetermined position and the information acquired by the content information acquiring unit 184 in another position. In other words, the display processing unit 192 arranges the information identifying the song being reproduced by its own terminal in a predetermined area of the second region 64. With the display position of the terminal's own song information fixed, the user can find the song being reproduced by his/her own terminal in the second region 64 easily. The display processing unit 192 may arrange in the second region 64 the information acquired by the reproduction information acquiring unit 182 in the topmost position and the information acquired by the content information acquiring unit 184 below it. An increase in the number of WLAN terminals in the surrounding area of the information processing apparatus 100*a* may result in an increase in the information on songs acquired by the content information acquiring unit 184. In such a case, it may not be possible to display all the information within the second region 64 on the LCD 12. By way of solution to this problem, a scroll bar 80 is provided as shown in FIG. 10. In this case, too, arranging the information identifying the song being reproduced by its own terminal in the topmost position of the second region 64 will ensure the display of the information on the LCD 12 with the scroll bar 80 indicating the topmost position. Accordingly, the user can recognize the song being reproduced by his/her own terminal easily.

As the information concerning a plurality of songs is list-displayed in the second region 64, the user can select a song to be audio-outputted, by operating on the arrow key 20 and the push button 30. This processing will be explained by referring to FIG. 5.

As the input receiving unit 102 receives a song title selection by the user, the communication control unit 114 sets a connection to a WLAN terminal apparatus that is playing (reproducing) said music (song), and the transmission request generator 172 generates a transmission request by which to make a request to the WLAN terminal apparatus that the audio data be sent from the WLAN terminal apparatus that is playing said song. The transmission request generator 172 has a function of generating at least three kinds of transmission requests (TR_REQ) according to a situation.

(1) TR_REQ1

TR_REQ1 is a packet requesting that the audio data be sent from the present reproduction point in a host.

When the user selects a song now being played by an terminal of another user on the reproduction screen of FIG. 10, the transmission request generator 172 generates TR_REQ1.

(2) TR_REQ2

TR_REQ2 is a packet requesting that audio data following the audio data last transmitted by the host (last received by the client) be sent.

The audio data sent from the host is accumulated in a buffer and then played. As the amount of the audio data accumulated in the buffer becomes smaller, the transmission request generator 172 generates TR_REQ2.

(3) TR_REQ3

TR_REQ3 is a packet requesting that the audio data from the top of a song to be played next after the present song being played be sent.

If the audio data, sent from the host in response to TR_REQ1 or TR_REQ2, contains a last part of the song, the transmission request generator 172 will generate TR_REQ3.

A predetermined field of a transmission request packet contains information (type information) used to identify the type of transmission request. Also, a predetermined field of each transmission request packet contains the byte size of a stream whose delivery is to be requested. The byte size is information specifying the size of data sent from the host.

If the input receiving unit 102 receives the song title selection by the user, the transmission request generator 172 will generate a transmission request (TR_REQ1) to a WLAN terminal apparatus that is playing the song. The transmitter 116 sends TR_REQ1 to the WLAN terminal apparatus via the wireless interface 112. Suppose that the user has selected a user icon 72a of "Mike" in FIG. 10. Then, the transmitter 116 will send TR_REQ1 to the WLAN terminal apparatus (the information processing terminal 100b of FIG. 6) of the user "Mike".

An operation of the information processing apparatus 100b that is a host is now described with reference to FIG. 6. Since the information processing apparatuses 100b operates as the host, it is presupposed herein that the basic reproduction function is performed by the information processing apparatus 100b. The reproduction processing unit 254 and the read control unit 256 in the information processing apparatus 100b correspond respectively to the reproduction processing unit 154 and the read control unit 156 both of which are assigned to the basic reproduction function in the information processing apparatus 100a that operates as the client.

The read control unit 256 controls the read-out of data from the memory unit 270. The reproduction processing unit 254 instructs the read control unit 256 to read the music data according to a playlist, which defines the order of songs to be played, for instance. The reproduction processing unit 254 reads out audio data from the top of a music file via the read control unit 256 and thereby starts a reproduction processing. The audio output unit 290 may output the audio signals reproduced by the reproduction processing unit 254. The reproduction processing unit 254 starts reproduction of the audio data and simultaneously presents information identifying the music (song) to be reproduced to the management unit 240. The information to be presented to the management unit 240 may include at least the song title, the artist name, and the time length of the song. The information may also include the cover photo image of the song or the like. The reproduction processing unit 254 may present such information prior to the start of reproduction processing of the audio data or at the start thereof. After the start of reproduction processing, the reproduction processing unit 254 may present information concerning the song being reproduced (now playing), such as the completed reproduction time, periodically to the management unit 240. The reproduction processing unit 254 generates audio signals through a decoding according to the compression format of the audio data. The audio output unit 190 outputs audio signals reproduced by the reproduction processing unit 154. The management unit 240 identifies the song being reproduced, from the information presented by the reproduction processing unit 254 and also identifies the reproduction time of the song being reproduced.

The information processing apparatus 100b periodically transmits, by broadcast, information identifying the song being reproduced by the reproduction processing unit 254 and information concerning the song(s) being reproduced in the IBSS. Though, in FIG. 5, the reproduction information acquiring unit 182 acquires information on a song being reproduced and then the transmitter 116 transmits it by broadcast, the management unit 240 in the information processing apparatus 100b operates like the reproduction information acquiring unit 182.

As the information processing apparatus 100a, which is the client, sends a transmission request (TR_REQ1), the receiver 218 of the information processing apparatus 100b, which is the host, receives the transmission request (TR_REQ1) via the wireless interface 212 and supplies the received transmission request to the transmission request acquiring unit 230. As the transmission request acquiring unit 230 presents the acquired transmission request (TR_REQ1) to the management unit 240, the management unit 240 identifies the type of the transmission request from the type information contained in the predetermined field. Also, the management unit 240 determines the size of byte contained in the predetermined field of the transmission request as the byte size of a stream to be delivered (delivered byte size).

As the transmission request is identified as TR_REQ1, the management unit 240 recognizes that the information processing apparatus 100a, which is the client, is requesting the transmission of audio data from the current reproduction point in the reproduction processing unit 254. The management unit 240 identifies the current reproduction point in the music data, based on the completed reproduction time periodically presented from the reproduction processing unit 254. And the management unit 240 presents the identified reproduction point as well as the information identifying the music data to the transmission data generator 260. The current reproduction point may be identified as offset information about the offset from the top of a song. Also, the management unit 240 supplies the determined "delivered byte size" to the transmission data generator 260. The management unit 240 records, in a storage unit such as the memory unit 270, information identifying the audio data to be delivered, offset information about the offset of the top of the delivered audio data from the top of the song, offset information about the offset of the end of the delivered audio data from the top of the song, the frame number of the beginning of data to be delivered, and so forth. The management unit 240 records and manages them in association with the identification information of the information processing apparatus 100a, which is the client. Hereinafter, the information recorded in the storage unit will be referred to as "management information". The management information is used to determine the range of data to be transmitted, when the transmission request is sent for the next time.

As the transmission data generator 260 receives the identification information of the audio data, the current reproduction point, and the delivered byte size presented by the management unit 240, the transmission data generator 260 instructs the read control unit 256 to read out the music data. Also, the transmission data generator 260 may instruct the read control unit 256 to read out the music data, when the identification information of the audio data, the offset information about the offset of the top of the delivered audio data from the top of the song (music) and the offset information about the offset of the end of the delivered audio data from the top of the song (music) are supplied from the management unit 240. The transmission data generator 260 reads out, via the read control unit 256, the music data being reproduced by the reproduction processing unit 254 by as much as the delivered byte size from the current reproduction point, and then generates transmission data to be sent to the information processing apparatus 100a.

Note also that the transmission data generator 260 may have the management information contained in the header of the transmission data, when the transmission data generator 260 receives the management information from the management unit 240. The header contains the song title, the artist name, the time length of the song, the cover photo image of the song and the like which are shown in the reproduction screen of the information processing apparatus 100a, which is the client. Also, the transmission data generator 260 sets in the header an EOF (End of File) flag indicating whether or not the audio data sent includes the end data of a song file. If the value of EOF flag is "0", it will indicate that the end data thereof is not included. If the value of EOF flag is "1", it will indicate that the end data thereof is included. The transmitter 216 transmits the transmission data to the information processing apparatus 100a via the wireless interface 212.

Referring to FIG. 5, the receiver 118 in the information processing apparatus 100a, which is the client, receives the transmission data sent from the information processing apparatus 100b via the wireless interface 112 and then supplies the received transmission data to the audio data acquiring unit 144. The audio data acquiring unit 144 stores the thus acquired audio data in a buffer (not shown) such as a ring buffer. The reproduction processing unit 146 starts to reproduce the audio data accumulated in the buffer and, at the same time, supplies information necessary for generation of the reproduction screen to the content information acquiring unit 184. The information presented to the content information acquiring unit 184 may include the song title, the artist name, the time length of the song, the cover photo image of the song and the like. The reproduction processing unit 146 may present such information prior to the start of reproduction processing of the audio data or at the start thereof. After the start of reproduction processing, the reproduction processing unit 146 may present information concerning the song being reproduced (now playing), such as the completed reproduction time, periodically to the content information acquiring unit 184. The reproduction processing unit 146 generates audio signals through a decoding according to the compression format of the audio data. In this manner, the additional reproduction function in the second reproduction unit 140 is carried out. At this time, the basic reproduction function in the first reproduction unit 150 continues to be executed without being suspended or stopped.

The audio output unit 190 has functions of selecting the audio signals reproduced by either of the reproduction processing unit 154 in the first reproduction unit 150 or the reproduction processing unit 146 in the second reproduction unit 140 and then outputting them. Selecting either one of them is determined by the user's operation as a general rule. More specifically, when the user operates on the arrow key 20 and the push button 30 in the second region 64 of the reproduction screen as shown in FIG. 10 and the like so as to select a song that outputs the sound, the audio output unit 190 outputs the audio signals of the song.

Figure 11:
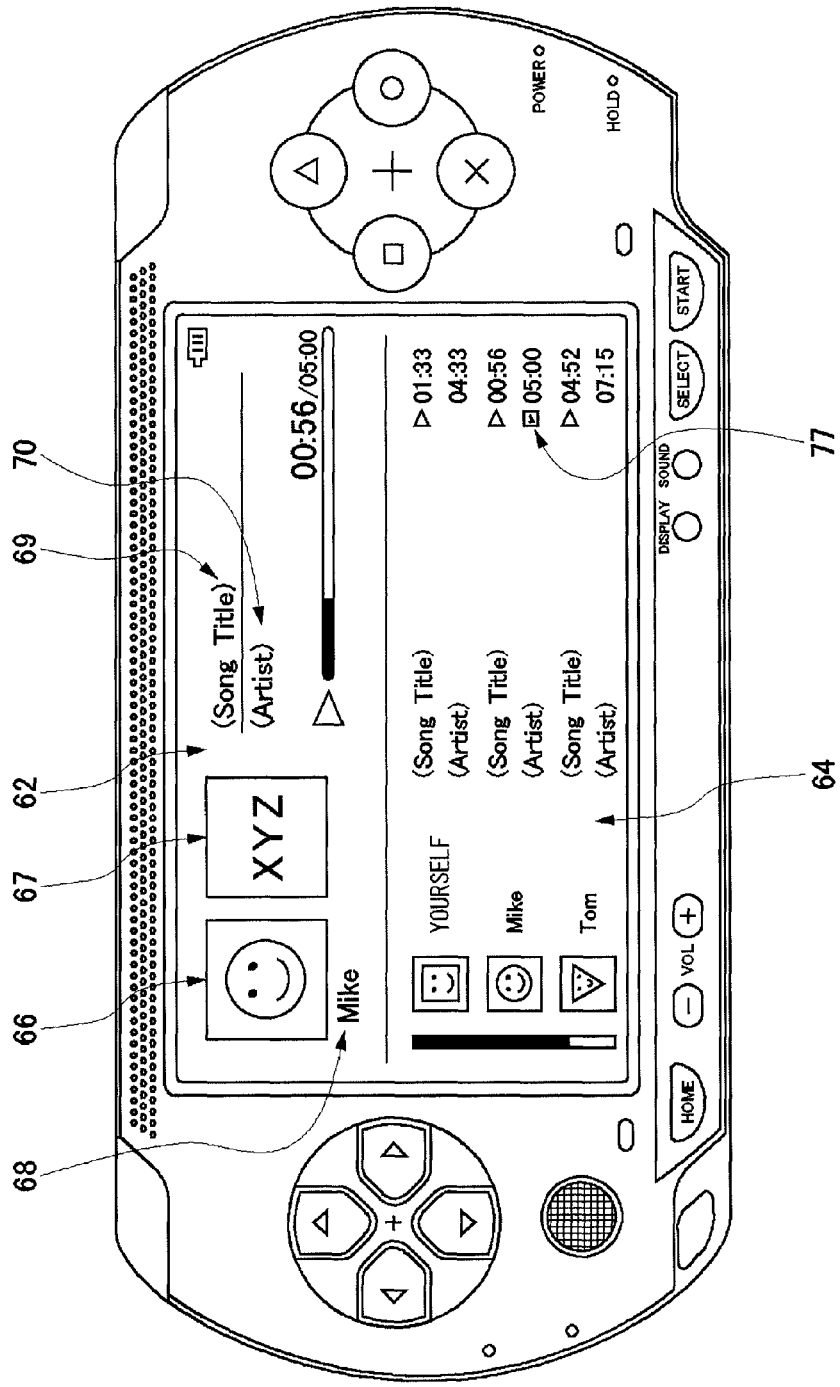
FIG. 11 shows an example of a reproduction screen.

FIG. 11 shows an example of a reproduction screen. FIG. 11 shows a state where the user selects the user icon 72a of "Mike" in the reproduction screen of FIG. 10 and where the information processing apparatus 100a acquires audio data from the information processing apparatus 100b of the user "Mike" so as to output the sound. The display processing unit 192 arranges the user icon 66 and the user name 68, which are to identify the user in possession of the song to be audio-outputted, the thumbnail 67, such as a cover photo of the song, the song title 69, the artist name 70, and the time information 71 showing the completed reproduction time relative to the time length of the song in the first region 62.

Also, the display processing unit 192 arranges the information identifying the songs that can be audio-outputted from the audio output unit 190. Since a song held by "Mike" is being currently audio-outputted, the output identification information 77 is added to the information identifying the song that is being reproduced by the "Mike" terminal. Although the output identification information 77 is indicated as a checked sign added to the second region 64, this may instead be indicated by a different display color for the song information, for instance, that enables the user to recognize that it is now being audio-outputted. As already mentioned, with the scroll bar 80 located on the topmost position, the information identifying the song reproduced by the user's own terminal is arranged in the topmost position of the second region 64.

While performing a reproduction processing in the second reproduction unit 140, the reproduction processing unit 146 monitors the amount of audio data held in the buffer (hereinafter referred to as "buffer size" also). If the buffer size becomes smaller than a predetermined amount, the reproduction processing unit 146 will convey to the transmission request generator 172 that the buffer size has become smaller than the predetermined amount. Upon receipt of the notification that the buffer size has become smaller than the predetermined amount, the transmission request generator 172 generates a transmission request (TR_REQ2) for the information processing apparatus 100b. As already mentioned, TR_REQ2 is a packet requesting that audio data following the audio data last transmitted by the host (last received by the client) be sent. The transmitter 116 transmits TR_REQ2 to the information processing apparatus 100b via the wireless interface 112.

Referring to FIG. 6, the receiver 218 in the information processing apparatus 100b, which is the host, receives the transmission request (TR_REQ2) via the wireless interface 212 and supplies the received transmission request to the transmission request acquiring unit 230. As the transmission request acquiring unit 230 presents the acquired transmission request (TR_REQ2) to the management unit 240, the management unit 240 identifies the type of transmission request from the type information contained in the predetermined field. Also, the management unit 240 determines the size of byte contained in the predetermined field of the transmission request as the byte size of a stream to be delivered (delivered byte size).

As the transmission request is identified as TR_REQ2, the management unit 240 recognizes that the information processing apparatus 100a, which is the client, is requesting the transmission of audio data following the audio data last transmitted by the host. The management unit 240 references the management information recorded in the storage unit and acquires the information identifying the audio data to be delivered, the offset information about the offset of the top of the delivered audio data from the top of the song, the offset information about the offset of the end of the delivered audio data from the top of the song, the frame number of the beginning of the delivered audio data, and so forth. The management unit 240 generates offset information about the offset of the top of the audio data to be delivered this time from the top of the song, based on the offset information about the offset of the end of the audio data delivered last time from the top of the song. The offset information about the offset from the top of the song as well as the information identifying the audio data is presented to the transmission data generator 260. Also, the management unit 240 supplies the determined "delivered byte size" to the transmission data generator 260. The management unit 240 records, in a storage unit such as the memory unit 270, the information identifying the audio data to be delivered, the offset information about the offset of the top of the audio data to be delivered from the top of the song, the offset information about the offset of the end of the audio data to be delivered from the top of the song, the frame number of the beginning of data to be delivered, and so forth. The management unit 240 records them in association with the identification information of the information processing apparatus 100a, which is the client, and updates the management information.

As the transmission data generator 260 receives the identification information of the audio data, information in association with the leading frame of the audio data to be delivered, and the delivered byte size presented by the management unit 240, the transmission data generator 260 instructs the read control unit 256 to read out the music data. The transmission data generator 260 reads out, via the read control unit 256, the music data being reproduced by the reproduction processing unit 254 by as much as the delivered byte size from the music data identified by the offset information on the top of the song, and then generates transmission data to be sent to the information processing apparatus 100a. Note also that the transmission data generator 260 may have the management information that is necessary for generation of the reproduction screen in the information processing apparatus 100a contained in the header of the transmission data, when the transmission data generator 260 receives the management information from the management unit 240. The transmitter 216 transmits the thus generated transmission data to the information processing apparatus 100a via the wireless interface 212.

Referring to FIG. 5, the receiver 118 in the information processing apparatus 100a, which is the client, receives the transmission data sent from the information processing apparatus 100b via the wireless interface 112 and then supplies the received transmission data to the audio data acquiring unit 144. The audio data acquiring unit 144 stores the thus acquired audio data in the buffer (not shown) such as a ring buffer. The reproduction processing unit 146 continues to reproduce the audio data stored in the buffer.

When storing the audio data in the buffer, the audio data acquiring unit 144 detects the value of the EOF flag contained in the header of the transmission data. If the value of EOF flag is "0", it will be determined that the acquired music data does not contain the end data of the song. While performing the reproduction processing, the reproduction processing unit 146 monitors the buffer size. And if the buffer size becomes smaller than a predetermined amount, the reproduction processing unit 146 will convey to the transmission request generator 172 that the buffer size has become smaller than the predetermined amount. Upon receipt of the notification that the buffer size has become smaller than the predetermined amount, the transmission request generator 172 generates a transmission request (TR_REQ2) for the information processing apparatus 100b. A series of such processes continue until when the value of EOF flag becomes "1", when the reproduction processing is terminated by the user's instruction, or when the song being reproduced is changed.

By employing the above-described structure and operations, the information processing apparatus 100a can synchronously reproduce the music being reproduced in the information processing apparatus 100b. Two independent systems coexist in the information processing apparatus 100a. That is, one is a system where the music (songs) held by the own terminal is reproduced, and the other is a system where a song being reproduced by another terminal is reproduced. Hence, the information processing apparatus 100a can function not only as a host or client in the synchronous stream reproduction system 1 but also simultaneously as the host and client.

As described above, the additional reproduction function is activated on condition that the basic reproduction function is being executed. For example, the content information acquiring unit 184 cannot acquire the information or the audio data acquiring unit 144 cannot acquire the audio data unless the basic reproduction function is in operation. The content information acquiring unit 184 and the audio data acquiring unit 144 are activated on condition that the basic reproduction function is being executed.

Figure 12:
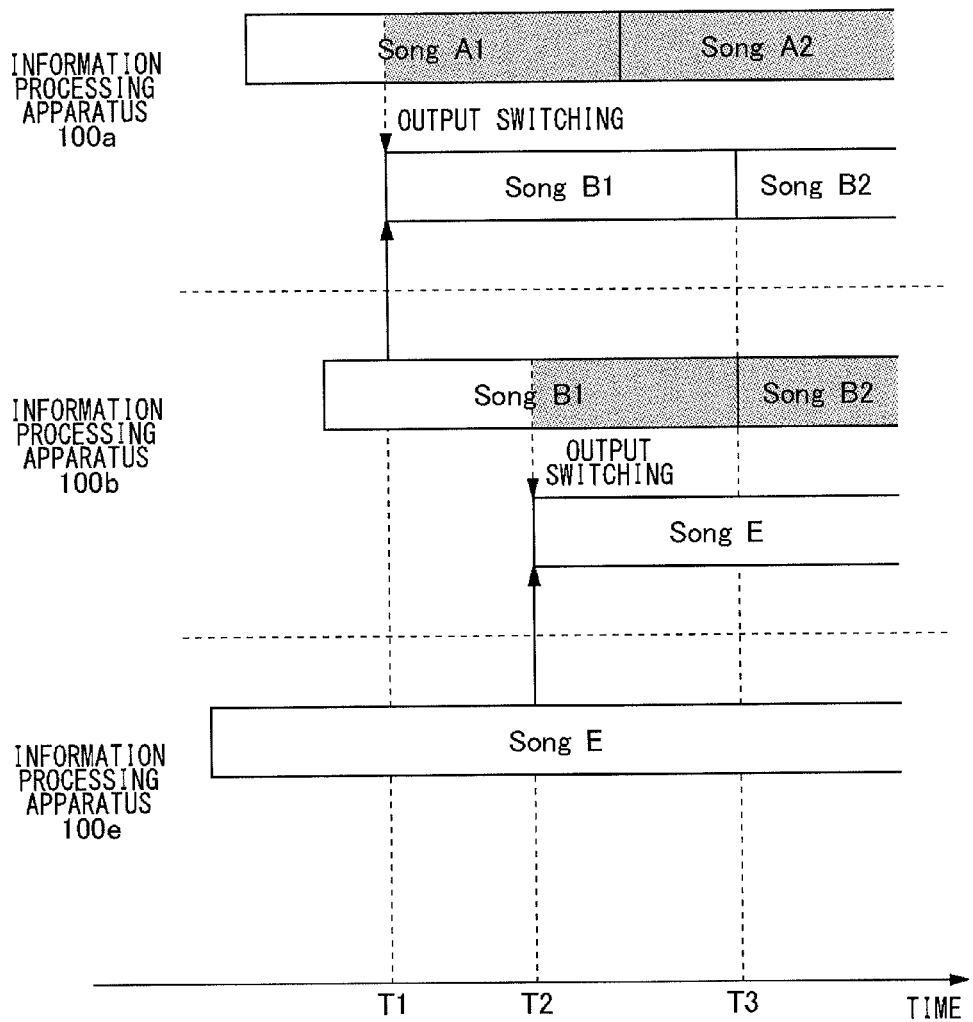
FIG. 12 shows exemplary states of audio outputs from information processing apparatuses.

FIG. 12 shows exemplary states of audio outputs from the information processing apparatuses 100. By executing the basic reproduction function, the information processing apparatus 100a continuously reproduces Song A1 and Song A2, the information processing apparatus 100b continuously reproduces Song B1 and Song B2, and the information processing apparatus 100e reproduces Song E. At time T1, the information processing apparatus 100a connects to the information processing apparatus 100b and then receives the song data of Song B1 from the reproduction point in the information processing apparatus 100b. As a result, the information processing apparatus 100b functions as a host to the information processing apparatus 100a, and the information processing apparatus 100a functions as a client. The audio output of the information processing apparatus 100a is switched from Song A1 to Song B1 at time T1.

At time T2, the information processing apparatus 100*b* connects to the information processing apparatus 100*e* and then receives the song data of Song E from the reproduction point in the information processing apparatus 100*e*. As a result, the information processing apparatus 100*e* functions as a host to the information processing apparatus 100*b*, and the information processing apparatus 100*b* functions as a client. In this example, the information processing apparatus 100*b* functions as a client at time T2 and onward. The audio output of the information processing apparatus 100*b* is switched from Song B1 to Song E at time T2.

If the basic reproduction function does not stop but continues, the information processing apparatus 100*a*, for instance, can switch the audio output from Song B1 to Song A1 at once. If, for example, the user finds Song B1 not so interesting, the audio output unit 190 can audio-output Song A1 continuously without time delay because the reproduction processing of Song A1 is continuing. The user can switch the audio output by selecting on the reproduction screen the song information on Song A1 displayed in the second region 64.

In the audio-output situation illustrated in FIG. 12, the information processing apparatus 100*b* terminates the reproduction processing of Song B1 at time T3 and starts a reproduction processing of the next song, namely Song B2. The order in which songs are reproduced is determined by the playlist, for instance. Although, as with a random reproduction mode, the user may not be aware of the next song to be reproduced, the reproduction processing unit 254 of the information processing apparatus 100*b* determines a song, which is to be reproduced next to Song B1, using a predetermined algorithm.

Referring to FIG. 6, the transmission data generator 260 in the information processing apparatus 100*b*, which is the host, reads the music (song) data, which is being reproduced by the reproduction processing unit 254, by as much as the delivered byte size or less, from the audio data identified by the offset information about the offset from the top of a song. Then the transmission data generator 260 generates the transmission data that is to be sent to the information processing apparatus 100*a*. If, at this time, the delivered byte size contains the end of the song file, the transmission data generator 260 will set the flag of EOF (End of File) in the transmission data to "1". Notice that if the end of the song file is contained, the audio data to be read out will be normally smaller than the delivered byte size. The transmitter 216 transmits the thus generated transmission data to the information processing apparatus 100*a* via the wireless interface 212.

Referring to FIG. 5, the receiver 118 in the information processing apparatus 100*a*, which is the client, receives the transmission data sent from the information processing apparatus 100*b* via the wireless interface 112 and then supplies the received transmission data to the audio data acquiring unit 144. The audio data acquiring unit 144 stores the thus acquired audio data in a buffer (not shown) such as a ring buffer. The reproduction processing unit 146 continues to reproduce the audio data accumulated in the buffer.

When storing the audio data in the buffer, the audio data acquiring unit 144 detects the value of the EOF flag contained in the header of the transmission data. Since the value of EOF is "1" in this case, it is determined that the song being reproduced will be terminated after the audio data stored in the buffer is used up. The audio data acquiring unit 144 conveys this decision result to the transmission request generator 172.

Upon receipt of the decision result, the transmission request generator 172 generates a transmission request (TR_REQ3) for the information processing apparatus 100*b*. As already mentioned, TR_REQ3 is a packet requesting that the audio data from the top of a song to be played next to the present song being played by the host be sent. The transmitter 116 transmits TR_REQ3 to the information processing apparatus 100*b* via the wireless interface 112.

Referring to FIG. 6, the receiver 218 in the information processing apparatus 100*b*, which is the host, receives the transmission request (TR_REQ3) via the wireless interface 212 and supplies the received transmission request to the transmission request acquiring unit 230. As the transmission request acquiring unit 230 presents the acquired transmission request (TR_REQ3) to the management unit 240, the management unit 240 identifies the type of transmission request from the type information contained in a predetermined field. As the transmission request is identified as TR_REQ3, the management unit 240 recognizes that the information processing apparatus 100*a*, which is the client, is requesting the transmission of audio data of a song to be reproduced next by the information processing apparatus 100*b*. The management unit 240 makes a request to the reproduction processing unit 254 that the information identifying a song to be reproduced next be sent.

The management unit 240 acquires, from the reproduction processing unit 254, the identification information of a song that is to be reproduced next. Also, the management unit 240 determines the size of byte contained in the predetermined field of the transmission request as the byte size of a stream to be delivered (delivered byte size). The management unit 240 presents the information identifying the song to be played next and the determined "delivered byte size" to the transmission data generator 260. As the transmission data generator 260 receives the identification information on the audio data and the delivered byte size presented by the management unit 240, the transmission data generator 260 instructs the read control unit 256 to read out the music data. The transmission data generator 260 reads out, via the read control unit 256, the music data to be reproduced by the reproduction processing unit 254 by as much as the delivered byte size from the beginning of a file, and then generates transmission data to be sent to the information processing apparatus 100*a*.

Figure 13:
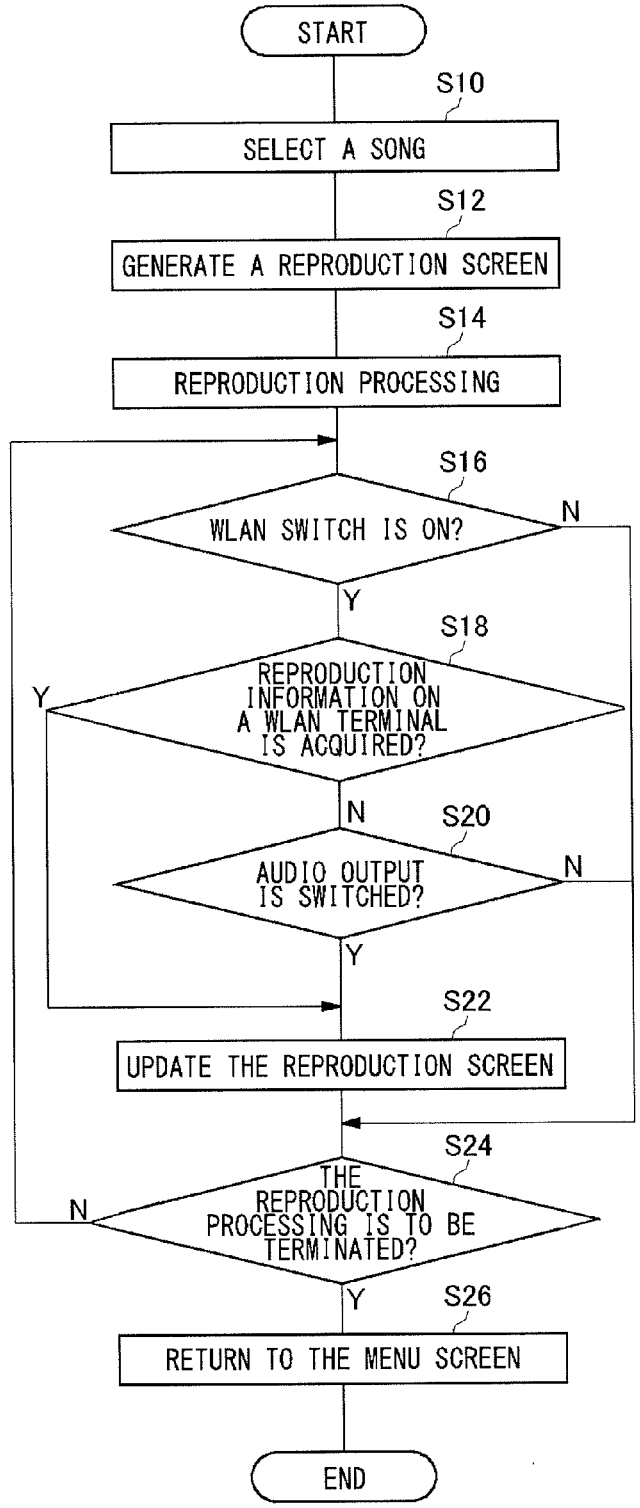
FIG. 13 is a flowchart showing a process of generating a reproduction screen.

FIG. 13 is a flowchart showing a process of generating a reproduction screen. In the following flowchart shown in FIG. 13, the procedure performed by each structural component is shown using S (the capital letter of "Step"), which means a step, and numbers combined. If a determining process is executed in a processing indicated by the combination of S and a number and if the decision result is positive, "Y" (the capital letter of "Yes") will be appended like "(Y of S10)". If, on the other hand, the decision result is negative, "N" (the capital letter of "No") will be appended like "(N of S10)". The same applies to the flowcharts shown in the other Figures (i.e., FIG. 15).

When the user selects the icon 60 of a musical note on the menu screen (see FIG. 7), the selection screen for music (song) is displayed on the LCD 12. The user selects a song that is to be reproduced (S10). Referring to FIG. 5, the input receiving unit 102 receives the song title selection by the user, the selector 152 conveys the song title selected for reproduction to the reproduction processing unit 154. As the reproduction processing unit 154 reads out the music (song) data via the read control unit 156, the reproduction processing unit 154 presents information identifying the song to be reproduced to the reproduction information acquiring unit 182 and then the reproduction information acquiring unit 182 supplies the information to the display processing unit 192. The display processing unit 192 generates a reproduction screen (see FIG. 9) to be displayed on the LCD 12, using the information supplied from the reproduction information acquiring unit

182 (S12). The reproduction processing unit 154 executes a reproduction processing from the top of the song file (S14).

If the WLAN switch 54 turns off during the reproduction processing (N of S16), no additional reproduction function will be carried out. If the reproduction processing is to be terminated by the user's instructions (Y of S24), the display screen will return to the menu screen (S26). If, on the other hand, the reproduction processing is not to be terminated (N of S24), the information processing apparatus 100 waits until the WLAN switch 54 turns on.

If the WLAN switch 54 is being turned on (Y of S16), the information processing apparatus 100 will monitor the signals that are being broadcast from the WLAN terminal apparatuses present in the surrounding area (S18). If the content information acquiring unit 184 acquires from the surround WLAN apparatuses the information identifying a song being reproduced (Y of S18), the display processing unit 192 will update the reproduction screen (see FIG. 10) to be displayed on the LCD 12, using the information presented by the content information acquiring unit 184 and the information presented from the reproduction information acquiring unit 182 (S22).

If, on the other hand, the content information acquiring unit 184 does not acquire from the surround WLAN apparatuses the information identifying a song being reproduced (N of S18), the audio output unit 190 will monitor whether or not there is an instruction from the user to switch the audio output (S20). If the user instructs the switching of the audio output (Y of S20), the display processing unit 192 will update the reproduction screen (see FIG. 11). If there is no instructions from the user to switch the audio output (N of S20), proceed to Step S24. If the reproduction time advances, the reproduction will be updated.

The present exemplary embodiment has shown an example where the display processing unit 192 generates a reproduction screen as shown in FIG. 11 when the user instructs the switching of the audio output in Step S20. If the procedure returns to Step S16 in the decision step of S24 after Step S22, there may be cases where the content information acquiring unit 184 acquires the information identifying a song being reproduced, from a new WLAN terminal apparatus. In such a case, it is preferable that the display processing unit 192 places the newly acquired information in a predetermined position of the second region 64. Since the display position of the terminal's own song information is fixed, the newly acquired song information is placed in a predetermined position different from the display position of the terminal's own song information. Fixing the display position of the newly acquired song information enables easy checking by the user of the newly acquired song information of another terminal apparatus.

Figure 14:
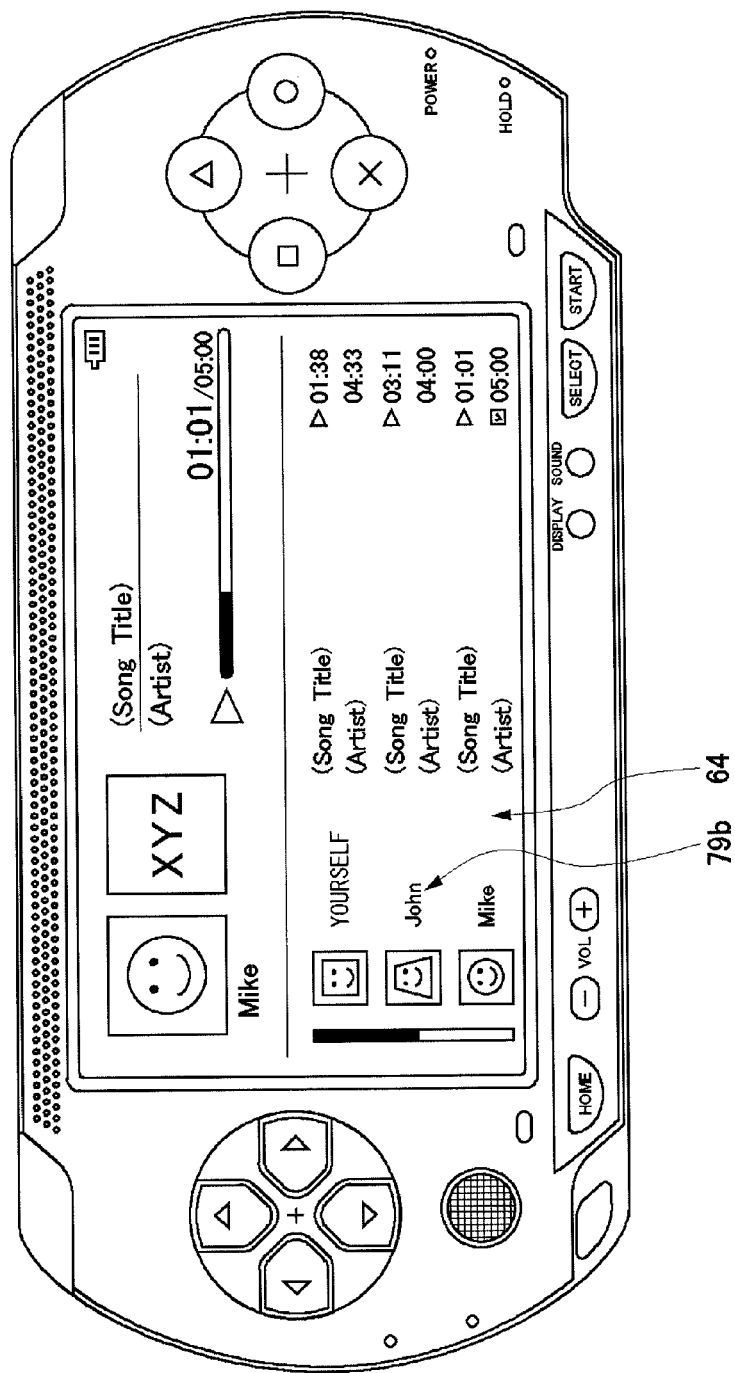
FIG. 14 shows an example of a reproduction screen.

FIG. 14 shows an example of a reproduction screen. The reproduction screen shown in FIG. 14 represents a state five seconds past the reproduction screen of FIG. 11, and song information concerning a user name 79*b* of "John", located below the terminal's own song information, which has been newly acquired is placed in the second region 64. Note that the song information, which has already been displayed, is shifted further below the song information concerning John and displayed there. As a result, the song information is list-displayed, below the terminal's own song information, in the chronological order, most recently acquired song information first. By employing the arrangement by which the song information on a newly discovered WLAN terminal apparatus is placed directly beneath the terminal's own song information, the song information that is being reproduced by the new WLAN terminal apparatus can be displayed on the LCD 12 as long as the scroll bar 80 indicates the topmost position, without operating on the scroll bar 80. Hence, the presence of the new song information that can be audio-outputted can be informed to the user.

Figure 15:
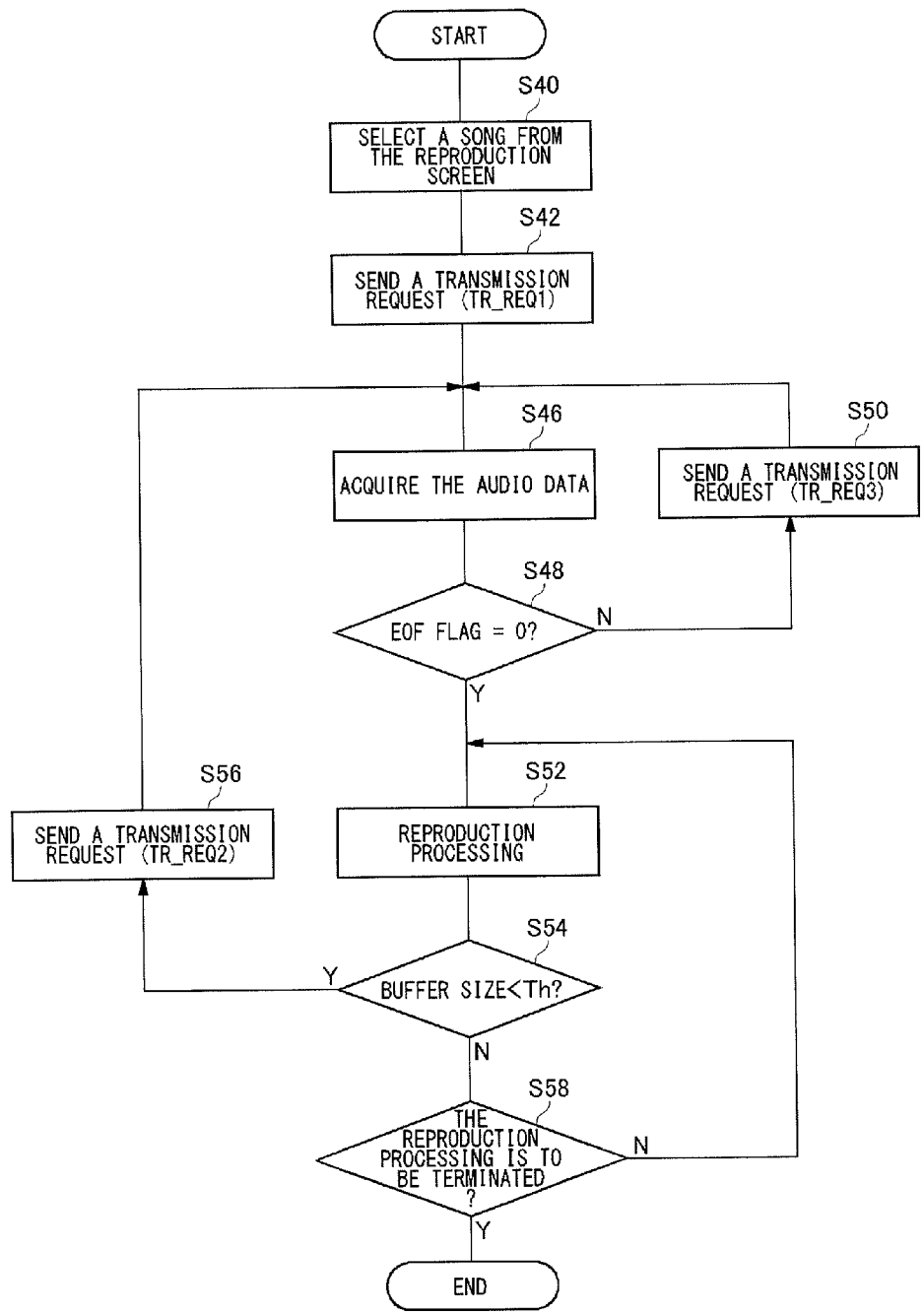
FIG. 15 is a flowchart showing a process of transmitting a transmission request from a client to a host.

FIG. 15 is a flowchart showing a process of transmitting a transmission request from a client to a host. The user selects from the reproduction screen (see FIG. 10) a song that is being reproduced by another WLAN terminal apparatus (S40). As the input receiving unit 102 receives the song title selection by the user, the communication control unit 114 sets a connection to the WLAN terminal apparatus that is reproducing the song. The transmission request generator 172 generates a transmission request (TR_REQ1) by which to make a request to the WLAN terminal apparatus that the audio data be sent from the WLAN terminal apparatus, and the transmitter 116 transmits the transmission request (S42).

The audio data acquiring unit 144 acquires audio data from the WLAN terminal apparatus and stores the thus acquired audio data in a buffer such as a ring buffer (S46). At this time, the audio data acquiring unit 144 detects the value of the EOF flag contained in the header of the transmission data (S48). If the value of EOF flag is "0" (Y of S48), the audio data acquiring unit 144 will recognize that the end of a song is not included in the audio data accumulated in the buffer. The reproduction processing unit 146 reads out the audio data from the buffer and executes a reproduction processing (S52). The reproduction processing unit 146 monitors the buffer size (S54). And if the buffer size is greater than or equal to a predetermined amount Th (N of S54), the reproduction processing unit 146 will continue the reproduction processing (S52) and monitor the buffer size (S54) unless the user instructs the termination of the reproduction processing (N of S58). If, on the other hand, the buffer size becomes smaller than the predetermined amount Th (Y of S54), the transmission request generator 172 will generate a transmission request (TR_REQ2) for the audio data and transmit the transmission request (S56).

If the value of EOF flag is "0" in Step S48, the audio data acquiring unit 144 will recognize that the end of the song is included in the audio data accumulated in the buffer. At this time, the transmission request generator 172 generates a transmission request (TR_REQ3) for the audio data and the transmitter 116 transmits the transmission request (S50). The timing with which the transmission request generator 172 generates the transmission request (TR_REQ3) may be when the buffer size becomes smaller than the predetermined amount Th after the audio data acquiring unit 144 has recognized that the end of the song is included in the audio data accumulated in the buffer. The processing of the flowchart shown in FIG. 15 ends when the user instructions the termination of the reproduction processing (Y of S58).

The above-described reproduction processing of content streams is performed after the user has selected another WLAN terminal apparatus. A description is given hereunder of an example where the information processing apparatus 100 automatically connects to another WLAN terminal apparatus and then acquires the audio data being reproduced by the another WLAN terminal apparatus.

As the input receiving unit 102 receives the input of a predetermined user's operation, the connection mode setting unit 104 sets a mode in which the information processing apparatus 100 is automatically connected to another WLAN terminal apparatus. The thus set automatic connection mode is conveyed to the communication control unit 114. Upon receipt of the notification that the automatic connection mode has been set, the communication control unit 114 periodically searches for any accessible WLAN terminals present in the surrounding area. When such a WLAN terminal apparatus is found, an IBSS is formed between the communication control unit 114 of the information processing apparatus 100 and the WLAN terminal found.

In the automatic connection mode, the communication control unit 114 sets a connection to the WLAN terminal apparatus. The transmission request generator 172 automatically generates a transmission request (TR_REQ1), and the transmitter 116 sends the transmission request to the WLAN terminal apparatus that connects to the information processing apparatus 100. The processes after this are those described above. The audio output unit 190 outputs the audio signals reproduced by the reproduction processing unit 146. Thus, in the automatic connection mode, if a WLAN terminal apparatus is present in the surrounding area, the song being reproduced by the WLAN terminal apparatus will be preferentially outputted from the audio output unit 190. If there are a plurality of items of song information that can be audio-outputted, the order in which a plurality of songs are reproduced may be determined according to the user's taste and preference, for instance, or the order may be determined in the order in which they are detected.

The user can set a reproduction mode in the automatic connection mode. For example, the reproduction mode may be a mode in which a song is played for a predetermined length of time such as 30 seconds only and a mode in which a song is played until the end. As the input receiving unit 102 receives a user's instruction to select the reproduction mode, the reproduction mode setting unit 142 sets the reproduction mode in the audio data acquiring unit 144 or the reproduction processing unit 146. The audio data acquiring unit 144 acquires audio data from the WLAN terminal apparatus according to the reproduction mode set thereby or the reproduction processing unit 146 reproduces the audio data. If the reproduction mode in which a song is played for 30 seconds is selected, the audio data acquiring unit 144 will have the transmission request generator 172 generate a transmission request by which to request the transmission of 30-second-long audio data. Thus the reproduction processing according to the user's taste and preference is achieved.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

The information processing apparatus 100 may periodically (e.g., every 5 seconds) transmit, by broadcast, the information identifying a song being reproduced and the information concerning the song being reproduced. As a result, the client can periodically update the reproduction screen. If the host changes the song reproduced, the information processing apparatus 100 will preferably transmit, by broadcast, new information at once.

Also, it is desirable that the number of clients to which the host distributes the content streams be limited to a predetermined number thereof. As the buffer size becomes smaller than the predetermined amount Th, the information processing apparatus 100, according to the present exemplary embodiment, which is the client sends a transmission request, so that the client synchronizes the host in the reproduction of a song. Thus, if the number of clients thereto is not restricted at all, the streams sent from the host may not be distributed in time and therefore the reproduction of the song may not continue to be synchronized between the host and the clients. In the light of this, it is preferable to reliably synchronize the reproduction thereof between the host and the clients by restricting the number of clients to a predetermined number thereof.

While the information processing apparatus 100 is outputting the audio signals from another information processing apparatus 100 in the synchronous stream reproduction system 1, the information processing apparatus 100 can instantly switch the audio signals to those reproduced by the user's own terminal. In this case, the reproduction processing of audio data sent from the another information processing apparatus 100 may be terminated with the timing when the audio signals were switched. Also, the reproduction processing may be terminated at the end of the song. The transmission request generator 172 may determine whether the transmission request is to be generated or not, based on the traffic on the wireless network, for instance. More specifically, the generation of the transmission request may be terminated with the timing of switching the audio signals, when the network is congested; the generation of the transmission request may be continued until the end of the song, when the network is not congested.

Also, while audio data from another information processing apparatus 100 is being reproduced, the user can select song information on still another information processing apparatus 100. In such a case, the connection to the previous information processing apparatus 100 is discarded and a new connection will be formed between the user's own information processing apparatus 100 and the new information processing apparatus 100.

Also, the information processing apparatus 100 may have a function of storing the song information acquired by the content information acquiring unit 184 as a history and displaying it. When the song information is displayed, the history may be generated such that, among the acquired items of song information, a distinction is made between songs that the user has actually listened to and those not. For example, the use of different colors or the setting of display order for the acquired items of song information may be conceivable as a way to make a distinction therebetween. As the user selects song information included in the history, the song can be directly purchased through an online shop. In this manner, realized is the synchronous stream reproduction system 1 that is beneficial to both the user and the shop.

If the host is a terminal apparatus installed in a music shop or the like, an arrangement may be such that a certain privilege such as a coupon is offered to the user if he/she has listened to the song until the end.

What is claimed is:

1. An information processing apparatus operable as both a client terminal and a host terminal, comprising:
   a central processing unit (CPU) and a memory configured to execute:
   a communication unit configured to receive a plurality of content streams using at least one of three types of transmission requests, wherein a first type of transmission request indicates data to be sent from a present reproduction point in a host;
   a first acquiring unit configured to acquire first identification information identifying a first content stream reproduced by the information processing apparatus, wherein the first content stream is stored on the information processing apparatus;
   a second acquiring unit configured to acquire, while detecting for a value of EOF flag contained in a header of transmission data, from a communicating terminal apparatus, second identification information identifying a second content stream being reproduced by the communicating terminal apparatus, wherein the second content stream is stored on the communicating terminal apparatus, and wherein the first content stream is different than the second content stream;
a reproduction unit configured to reproduce audio data and to present information identifying content to be reproduced to a management unit;
a reproduction processing unit configured to monitor a buffer size, wherein when the buffer size is greater than or equal to a predetermined amount threshold, the reproduction processing unit continues reproduction processing and monitoring the buffer size until a user instructs a termination of the reproduction processing, and when the buffer size becomes smaller than the predetermined amount threshold, a transmission request generator generates and transmits a second transmission request for the audio data;
an audio output unit configured to output an audio signal reproduced by the reproduction unit;
a display processing unit configured to generate a display screen to be displayed on a display, by using the first identification information and the second identification information acquired by the first acquiring unit and the second acquiring unit, respectively; and
a screen display unit configured to display the display screen generated by the display processing unit;
wherein the display processing unit places identification information identifying a content stream, currently being outputted from the audio output unit, in a first region of the display screen, and
the display processing unit places the first identification information and the second identification information acquired by the first acquiring unit and the second acquiring unit, respectively, in a second region of the display screen.

2. The information processing apparatus according to claim 1, wherein the first region is located above the second region.

3. The information processing apparatus according to claim 1, wherein the display processing unit adds information, which indicates the content stream being audio-outputted, to the identification information in the second region corresponding to the identification information in the first region.

4. The information processing apparatus according to claim 1, wherein the reproduction unit includes:
a first reproduction processing unit configured to reproduce audio data by reading out the audio data from a storage unit;
an audio data acquiring unit configured to acquire, from the communicating terminal apparatus, audio data being reproduced by the communicating terminal apparatus; and
a second reproduction processing unit configured to reproduce the audio data acquired by the audio data acquiring unit;
wherein the audio output unit selects an audio signal reproduced by either the first reproduction processing unit or the second reproduction processing unit so as to output the selected audio signal.

5. The information processing apparatus according to claim 4, wherein the second acquiring unit is capable of acquiring the second identification information or the audio data acquiring unit is capable of acquiring, from the communicating terminal apparatus, the audio data being reproduced by the communicating terminal apparatus, on condition that the audio data is being reproduced by the first reproduction processing unit.

6. The information processing apparatus according to claim 1, wherein the display processing unit places the first identification information in a first predetermined position of the second region.

7. The information processing apparatus according to claim 6, wherein, when the second acquiring unit acquires new second identification information, the display processing unit places the new second identification information acquired in a second predetermined position that differs from the first predetermined position.

8. A program, embedded in a non-transitory computer-readable medium, the program comprising:
a communication module configured to receive a plurality of content streams using at least one of three types of transmission requests, wherein a first type of transmission request indicates data to be sent from a present reproduction point in a host;
a reproduction module operative to reproduce audio data and to present information identifying content to be reproduced to a management unit;
a first acquiring module operative to acquire first identification information identifying first audio data to be reproduced, wherein the first audio data is stored on the information processing apparatus;
a second acquiring module operative to acquire, while detecting for a value of EOF flag contained in a header of transmission data, from a communicating terminal apparatus, second identification information identifying second audio data being reproduced by the communicating terminal apparatus, wherein the second audio data is stored on the communicating terminal apparatus, and wherein the first audio data is different than the second audio data;
a reproduction processing module configured to monitor a buffer size, wherein when the buffer size is greater than or equal to a predetermined amount threshold, the reproduction processing module continues reproduction processing and monitoring the buffer size until a user instructs a termination of the reproduction processing, and when the buffer size becomes smaller than the predetermined amount threshold, a transmission request generator generates and transmits a second transmission request for the audio data;
an audio output module operative to output an audio signal reproduced by the reproduction module;
a display processing module operative to generate a display screen to be displayed on a display, by using the first identification information and the second identification information acquired by the first acquiring module and the second acquiring module, respectively; and
a screen display module operative to display the display screen generated by the display processing module;
wherein the display processing module places identification information identifying a content stream, currently being outputted from the audio output module, in a first region of the display screen, and
the display processing module places the first identification information and the second identification information acquired by the first acquiring module and the second acquiring module, respectively, in a second region of the display screen.

\* \* \* \* \*